United States Patent
Leonard et al.

(10) Patent No.: US 10,861,039 B2
(45) Date of Patent: Dec. 8, 2020

(54) BID PLATFORM

(71) Applicant: ROYAL BANK OF CANADA, Montreal (CA)

(72) Inventors: Peter Vincent Leonard, Toronto (CA); Edison U. Ortiz, Orlando, FL (US); Iustina-Miruna Vintila, Bucharest (RO); Marko Pavlovic, Montreal (CA)

(73) Assignee: ROYAL BANK OF CANADA, Montreal (CA)

( * ) Notice: Subject to any disclaimer, the term of this patent is extended or adjusted under 35 U.S.C. 154(b) by 219 days.

(21) Appl. No.: 15/951,244

(22) Filed: Apr. 12, 2018

(65) Prior Publication Data

US 2018/0300741 A1   Oct. 18, 2018

Related U.S. Application Data

(60) Provisional application No. 62/484,457, filed on Apr. 12, 2017.

(51) Int. Cl.
*G06Q 30/02* (2012.01)
*G06Q 30/08* (2012.01)
*G06Q 30/06* (2012.01)

(52) U.S. Cl.
CPC ......... *G06Q 30/0222* (2013.01); *G06Q 30/08* (2013.01); *G06Q 30/0641* (2013.01)

(58) Field of Classification Search
CPC ....................................... G06Q 30/0207–0277
See application file for complete search history.

(56) References Cited

U.S. PATENT DOCUMENTS

| | | | | |
|---|---|---|---|---|
| 7,610,233 B1 * | 10/2009 | Leong | ................ | G06Q 10/087 705/26.3 |
| 9,600,831 B1 * | 3/2017 | Chou | ................ | G06Q 30/0242 |
| 9,892,460 B1 * | 2/2018 | Winklevoss | ........... | G06Q 40/04 |
| 9,898,782 B1 * | 2/2018 | Winklevoss | ........... | G06Q 40/04 |
| 10,068,228 B1 * | 9/2018 | Winklevoss | ........... | G06Q 20/36 |

(Continued)

FOREIGN PATENT DOCUMENTS

| | | | | |
|---|---|---|---|---|
| KR | 2018-0115764 A | * 11/2018 | ............. | G06Q 20/38 |
| WO | WO 2017/145008 A1 | * 8/2017 | ............. | G06Q 20/06 |

(Continued)

OTHER PUBLICATIONS

WIPO, International Search Report and Written Opinion for International Application No. PCT/CA2018/050448 dated Jul. 17, 2018.

(Continued)

*Primary Examiner* — David J Stoltenberg
(74) *Attorney, Agent, or Firm* — Norton Rose Fulbright Canada LLP; Maya Medeiros

(57) ABSTRACT

A bid platform for electronic commerce uses smart contracts and a distributed ledger to manage bids and offers for products. The bid platform receives a bid for a product, generates a bid event on a distributed ledger using the smart contracts, propagates the bid event to merchants using the smart contracts and the distributed ledger, receives one or more offers, generates one or more offer events on the distributed ledger using the smart contracts, propagates the one or more offer events using the smart contracts and the distributed ledger, and receives an accepted offer.

25 Claims, 19 Drawing Sheets

(56) References Cited

U.S. PATENT DOCUMENTS

| | | | | |
|---|---|---|---|---|
| 2014/0019337 | A1* | 1/2014 | Esch | G06Q 20/24 705/39 |
| 2014/0095324 | A1* | 4/2014 | Cabral | G06Q 30/08 705/14.71 |
| 2015/0026072 | A1* | 1/2015 | Zhou | H04M 1/72522 705/71 |
| 2015/0081467 | A1* | 3/2015 | Grigg | G06Q 30/08 705/26.3 |
| 2015/0100449 | A1* | 4/2015 | Garcia | G06Q 30/08 705/26.3 |
| 2015/0220928 | A1* | 8/2015 | Allen | G06Q 20/0655 705/67 |
| 2015/0228004 | A1* | 8/2015 | Bednarek | G06Q 30/0633 705/26.8 |
| 2015/0310497 | A1* | 10/2015 | Valin | G06Q 30/0269 705/14.66 |
| 2015/0348169 | A1* | 12/2015 | Harris | G06Q 30/0633 705/26.8 |
| 2015/0356524 | A1* | 12/2015 | Pennanen | G06Q 20/4012 705/71 |
| 2016/0012424 | A1* | 1/2016 | Simon | G06Q 20/3674 705/67 |
| 2016/0012465 | A1* | 1/2016 | Sharp | G06Q 20/18 705/14.17 |
| 2016/0098723 | A1* | 4/2016 | Feeney | G06Q 20/4016 705/75 |
| 2016/0098730 | A1* | 4/2016 | Feeney | G06Q 30/0185 705/71 |
| 2016/0162873 | A1* | 6/2016 | Zhou | G06Q 20/3227 705/67 |
| 2016/0210658 | A1* | 7/2016 | Chittilappilly | G06Q 30/0204 |
| 2016/0260171 | A1* | 9/2016 | Ford | G06Q 40/04 |
| 2016/0335533 | A1* | 11/2016 | Davis | G06F 9/44 |
| 2017/0011460 | A1* | 1/2017 | Molinari | G06F 21/645 |
| 2017/0046680 | A1* | 2/2017 | Crites | G06Q 30/0623 |
| 2017/0053249 | A1* | 2/2017 | Tunnell | H04L 9/3228 |
| 2017/0109735 | A1* | 4/2017 | Sheng | H04L 9/3247 |
| 2017/0140408 | A1* | 5/2017 | Wuehler | G06Q 30/0207 |
| 2017/0140418 | A1* | 5/2017 | Yadagiri | G06Q 30/0244 |
| 2017/0148051 | A1* | 5/2017 | Bagheri | G06Q 30/0246 |
| 2017/0154331 | A1* | 6/2017 | Voorhees | G06Q 20/3829 |
| 2017/0221032 | A1* | 8/2017 | Mazed | G06F 3/011 |
| 2017/0228731 | A1* | 8/2017 | Sheng | G06Q 20/401 |
| 2017/0243214 | A1* | 8/2017 | Johnsrud | G06Q 20/401 |
| 2017/0338963 | A1* | 11/2017 | Berg | H04L 9/14 |
| 2017/0352116 | A1* | 12/2017 | Pierce | G06Q 50/184 |
| 2018/0018723 | A1* | 1/2018 | Nagla | G06Q 30/0609 |
| 2018/0039667 | A1* | 2/2018 | Pierce | G06F 16/2379 |
| 2018/0075527 | A1* | 3/2018 | Nagla | G06Q 40/025 |
| 2018/0130130 | A1* | 5/2018 | Dechu | G06Q 40/04 |
| 2018/0157999 | A1* | 6/2018 | Arora | G06Q 10/025 |
| 2018/0300741 | A1* | 10/2018 | Leonard | G06Q 30/08 |
| 2018/0322597 | A1* | 11/2018 | Sher | H04L 67/22 |
| 2019/0043048 | A1* | 2/2019 | Wright | G06Q 20/223 |
| 2019/0057362 | A1* | 2/2019 | Wright | G06Q 20/065 |
| 2019/0066149 | A1* | 2/2019 | Strong | G06N 20/00 |
| 2019/0130399 | A1* | 5/2019 | Wright | G06Q 20/065 |

FOREIGN PATENT DOCUMENTS

| | | | | |
|---|---|---|---|---|
| WO | WO 2017/163090 | A1 * | 9/2017 | G06Q 20/06 |
| WO | WO 2018/149504 | A1 * | 8/2018 | G06Q 20/00 |
| WO | WO 2018/142948 | A1 * | 9/2018 | G06Q 40/02 |
| WO | WO 2019/213779 | A1 * | 11/2019 | G06F 16/27 |

OTHER PUBLICATIONS

"Blockchain—Wikipedia", Apr. 11, 2017, retrieved online on May 31, 2018 from https://en.wikipedia.org/w/index.php?title=Blockcahin&oldid=774989655.

\* cited by examiner

FIG. 13

| Post BMB | Search | Decide | Bid | Buy | Financing |
|---|---|---|---|---|---|
| Jeff | • Jeff decides it's time to get an SUV now that there's a new kid on the way<br>• He conducts a lot of research over the next few weeks—his browser is full of tabs of car review sites | • He opens ??? which he knows has BidMyBuy—???? said that this was the place to go for a deal | • He presses Bid and discovers that the best deal is in another city, from a manufacturer in Michigan | • Jeff presses Chat, and has a discussion with a BidMyBuy representative who answers all of his questions<br>• Jeff knows that this transaction is backed by guarantee, so he's comfortable with making such a large purchase over the internet<br>• He arranged to pick up the car for a local dealer which is where he will go for servicing. | • Jeff knew he had to get a loan to finance his purchase but didn't have the energy to call around to his local FIs.<br>• He decided to see which FI would offer him the best rate on his loan through BMB |
| Cars | • Uses adwords to target specific geographies, demographics & purchasing behavior | • Still works hard to maintain customer satisfaction ratings | • Their stock & pricing model is plugged into an algorithm and every prospect gets a unique bid offered to them | • They can rest easy knowing that they maximized their value and customer satisfaction<br>• The sale is entered into new inventory management system based on the block chain and smart contracts | |
| a | • Uses the standard marketing channels (online, radio, tv, print) | • Would like to expand their reach to new geographical locations | • They enter their criteria into an algorithm, and every prospect that meets their requirements will get offered a bid | • Since the customer FICO, AMI and KYC has already been vetted and matches the criteria we outlined the system provided a rate (bid) that we think is fair | • Jeff has accepted their offer and a contract is signed through e-signature<br>• Jeff is paired with an auto loan specialist to help him with any questions if required<br>• The money is transferred |

| | Search | Decide | ⒷBid | Buy | ⒷFinancing |
|---|---|---|---|---|---|
| Pre BMB | | | | | |
| Mary | • After a few weeks of ignoring that noise in her dishwasher, Mary knows that it is time to get a new one.<br>• Mary searches "dishwashers" and clicks around the first page of results. | • The second link she clicked looked like a pretty respectable company, so she gives them a call. | | • Mary doesn't have time to shop around so she purchases the dishwasher with the first company she calls<br>Her daughter insists that this would've saved money if she called a few other places but Mary thinks she probably got getter quality | |
| Appliance Brothers | • Occasionally uses adwords to target high level geography & demographics but it's really expensive | • The pricing model usually requires home delivery | | • They're competing with so many companies it's tough to close a sale. Since it's so tough, they have to bake a higher margin into these prices to make ends meet. | |
| Post BMB | | | | | |
| Mary | • After a few weeks of ignoring that noise in her dishwasher, Mary knows that it is time to get a new one.<br>• Mary searches "dishwashers" and clicks around the first page of results. | • She opens a webpage which she knows has BidMyBuy - her account manager at FI told her all about it | • She presses Bid and watches the top 5 quote ranges come in | • She presses Buy and the local company comes up. She picks the one with the lowest price and best delivery option<br>• When the time comes for billing it is done all online with no hidden fees, and she ends up paying a few dollars less than she thought she would have to | |
| Appliance Brothers | • Uses adwords to target specific geographies, demographics & purchasing behavior | • Still works hard to maintain customer satisfaction ratings but now they know that they can compete with the big folks | • Their stock & pricing model is plugged into an algorithm and every prospect gets a unique bid offered to them<br>• Their specialists worked with machine learning algorithm builders to give educated quote ranges for different types of services | • They can rest easy knowing that they maximized their value and customer satisfaction<br>• The sale is entered into new inventory / client management system - it's based on blockchain and smart contracts | |

FIG. 14

BID PLATFORM

FIELD

The improvements generally relate to the field of distributed ledger platforms and electronic commerce.

INTRODUCTION

Users can search for products to purchase using search engines and electronic commerce applications. Interfaces can display products to purchase at user devices.

SUMMARY

In accordance with an aspect, there is provided a bid platform to store and manage smart contracts for bids to purchase products and responding offers. The bid platform receives a bid for a product, generates a bid event on a distributed ledger using the smart contracts, propagates the bid event to merchants using the smart contracts and the distributed ledger, receives one or more offers, generates one or more offer events on the distributed ledger using the smart contracts, propagates the one or more offer events using the smart contracts and the distributed ledger, and receives an accepted offer. The bid platform receives a financing bid, generates a financing event on the distributed ledger using the smart contracts, propagates the financing event using the distributed ledger, receives one or more financing offers, generates one or more offer events, and receives an accepted offer.

In accordance with an aspect, there is provided a system for generating and updating a user interface for electronic commerce. The system has a plurality of nodes providing a distributed ledger, each node comprising a computing device. The system has a processor configured to process machine interpretable instructions to: receive a bid for a product from a purchaser device; transmit a request to store a bid event as a block on the distributed ledger, the block indicating a purchaser identifier and a product identifier; transmit notification of the bid event; receive offers for the bid from a plurality of merchant devices; transmit another request to store offer events as additional blocks on the distributed ledger, the additional blocks indicating merchant identifiers and being linked to the block storing the bid event; process the bid event to generate a set of offers from the offer events at the distributed ledger; generate an interface with visual elements to indicate the set of offers for display at the purchaser device, the interface having selectable indicia configured to be responsive to input to select a selected offer of the set of offers; responsive to selectable indicia, receive the selected offer of the set of offers at the interface; and store a purchase event as a purchase block on the distributed ledger, the purchase event indicating the bid event and the selected offer.

In some embodiments, the block storing the bid event has computer code implementing a bid smart contract indicating bid parameters and bid time period.

In some embodiments, the block storing the offer event has computer code implementing an offer smart contract indicating an offer rule.

In some embodiments, the offer rule indicates a percentage of a price discount and a condition for the price discount.

In some embodiments, the condition for the price discount relates to a customer rank or score, the processor being configured to compute the customer rank or score based on purchase data.

In some embodiments, the plurality of nodes are configured to implement concurrency so that smart contract execution on the distributed ledger is sequential, single threaded and not parallelized.

In some embodiments, the processor is configured to: generate a finance request to request financing for the product purchase; record the finance request as a block on the distributed ledger as a finance request event; generate and transmit notification of the finance request event using the distributed ledger; create a finance bid to respond to the finance request for the product purchase; record the finance bid as another block on the distributed ledger as a finance bid event; match the finance request event to the finance bid event and queue the matched finance bid event in a priority order; transmit the matched finance bid event to populate the interface with an additional visual element indicating data relating to the matched finance bid event for display at a purchaser device and acceptance using another selectable indicia of the interface; responsive to the other selectable indicia at the interface, receive an accepted finance offer; and complete the purchase transaction using the accepted finance offer.

In some embodiments, the block storing the finance request has computer code to implement a finance request smart contract for the finance event.

In some embodiments, the block storing the finance bid has computer code to implement a finance bid smart contract for the finance event In some embodiments, the processor is configured to automatically match pre-existing offers to user bids using machine learning rules.

In some embodiments, the plurality of nodes are configured to read-lock blocks when entering or updating a block, and unlocking the block once any related writing to the distributed ledger is completed.

In some embodiments, the processor is configured to generate a bid session for the purchaser, the bid session indicating with a session identifier, a price range, location preferences, shipping options, return options, time ranges, and an active status, wherein the processor is configured to receive the offers with the bid session has an active status.

In another aspect there is provided a bid platform with a data storage device and a processor configured to: create a bid smart contract for a product to request offers; records the bid smart contract on a distributed ledger as a bid event, the distributed ledger managed by a plurality of nodes, each node having a computing device; create an offer smart contract for a product to request notifications for bids for the product; add the offer smart contract to the distributed ledger as an offer event; automatically match the bid event to the offer events; generate and transmit notification of the bid event recorded on the distributed ledger using the offer smart contracts; queues the offer events in a priority order based on merchant profiles and offer details; transmits a set of offers to populate an interface with visual elements indicating the set of offers for display at a purchaser device and acceptance using a selectable indicia of the interface; responsive to the selectable indicia, receive an accepted offer in response to the bid on the product; complete a purchase transaction for the product using the accepted offer; and store a purchase event on the distributed ledger.

In some embodiments, the processor is configured to: create a finance request smart contract to request financing for the product purchase; record the finance request smart contract to the distributed ledger as a finance request event; create a finance bid smart contract to respond to the finance request for the product purchase; record the finance bid smart contract to the distributed ledger as a finance bid event; generate and transmits notification of the finance request event using the distributed ledger; match finance request event to finance bid event and queues the matched finance bid events in a priority order; transmit of set of finance offers to populate the interface with additional visual elements indicating the set of finance offers for display at a purchaser device and acceptance using another selectable indicia of the interface; responsive to the other selectable indicia at the interface, receive an accepted finance offer; and complete the purchase transaction using the accepted finance offer.

In some embodiments, the processor is configured to lock events recorded on the distributed ledger, and unlock the events when responding events are recorded on the distributed ledger.

In some embodiments, the processor is configured to generate a bid session for the purchaser, the bid session indicating with a session identifier, a price range, location preferences, shipping options, return options, time ranges, and an active status, wherein the processor is configured to receive the offers with the bid session has an active status.

In some embodiments, the block storing the bid event has computer code implementing the bid smart contract indicating bid parameters and bid time period.

In some embodiments, the block storing the offer event has computer code implementing the offer smart contract indicating an offer rule.

In some embodiments, the offer rule indicates a percentage of a price discount and a condition for the price discount.

In some embodiments, the condition for the price discount relates to a customer rank or score, the processor being configured to compute the customer rank or score based on purchase data.

In some embodiments, the plurality of nodes are configured to implement concurrency so that smart contract execution on the distributed ledger is sequential, single threaded and not parallelized.

In some embodiments, the processor is configured to: generate a finance request to request financing for the product purchase; record the finance request as a block on the distributed ledger as a finance request event; generate and transmit notification of the finance request event using the distributed ledger; create a finance bid to respond to the finance request for the product purchase; record the finance bid as another block on the distributed ledger as a finance bid event; match the finance request event to the finance bid event and queue the matched finance bid event in a priority order; transmit the matched finance bid event to populate the interface with an additional visual element indicating data relating to the matched finance bid event for display at a purchaser device and acceptance using another selectable indicia of the interface; responsive to the other selectable indicia at the interface, receive an accepted finance offer; and complete the purchase transaction using the accepted finance offer.

In some embodiments, the processor is configured to automatically match pre-existing offers to user bids using machine learning rules.

In some embodiments, the plurality of nodes are configured to read-lock blocks when entering or updating a block, and unlocking the block once any related writing to the distributed ledger is completed.

In accordance with another aspect, there is provided a computer readable medium comprising computer executable instructions that when executed by a processor configure the processor to implement a process for: receiving a bid for a product and storing a bid event on a distributed ledger using smart contracts; receiving offers for the bid and storing offer events on the distributed ledger using the smart contracts; transmitting notification of the bid event; processing the bid event to generate a set of offers from the offer events; updating an interface to indicate the set of offers; receiving a selected offer of the set of offers; and storing a purchase event on the distributed ledger, the purchase event indicating the bid event and the selected offer.

In accordance with another aspect, there is provided a bid platform with smart contracts and a distributed ledger, the bid platform receives a bid for a product, generates a bid event on a distributed ledger using the smart contracts, propagates notification of the bid event using the smart contracts and the distributed ledger, receives one or more offers, generates one or more offer events on the distributed ledger using the smart contracts, propagates the one or more offer events using the smart contracts and the distributed ledger, and receives an accepted offer.

In accordance with another aspect, there is provided a bid platform with smart contracts and a distributed ledger, the bid platform receives a financing bid of an accepted offer for a bid on a product, generates a financing event on the distributed ledger using the smart contracts, propagates the financing event using the distributed ledger, receives one or more financing offers, generates one or more offer events, and receives an accepted financing offer.

Many further features and combinations thereof concerning embodiments described herein will appear to those skilled in the art following a reading of the instant disclosure.

DESCRIPTION OF THE FIGURES

Embodiments will now be described, by way of example only, with reference to the attached figures, wherein in the figures:

FIG. 13 is a flowchart diagram of a process for bidding according to some embodiments;

FIG. 14 is a flowchart diagram of a process for bidding according to some embodiments.

DETAILED DESCRIPTION

Figure 1:
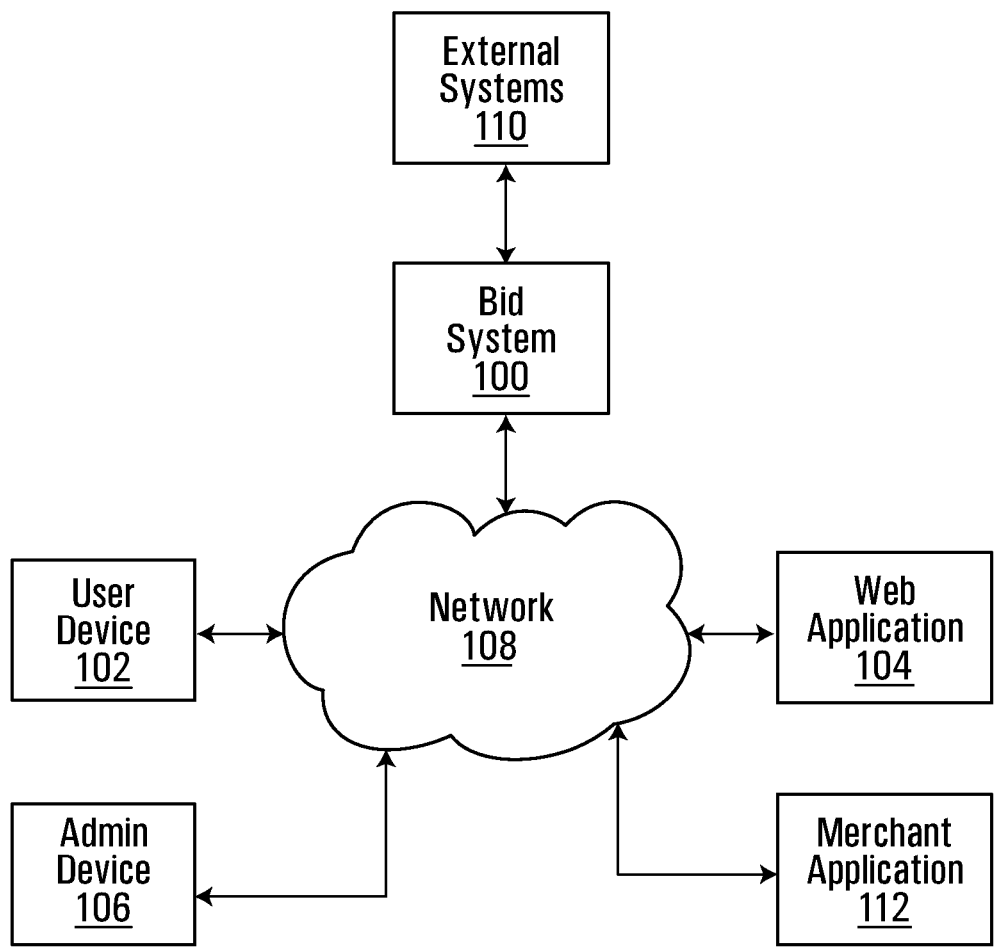
FIG. 1 is a view of an example system integrating bid platform.

FIG. 1 is a view of an example system integrating bid platform 100. The bid platform 100 connects to external system 110, user device 102, web application 104, administrator device 106, merchant application and other components in various ways including directly coupled and indirectly coupled via the network. Network 108 (or multiple networks) is capable of carrying data and can involve wired connections, wireless connections, or a combination thereof. Network 108 may involve different network communication technologies, standards and protocols, such as for example.

Figure 2:
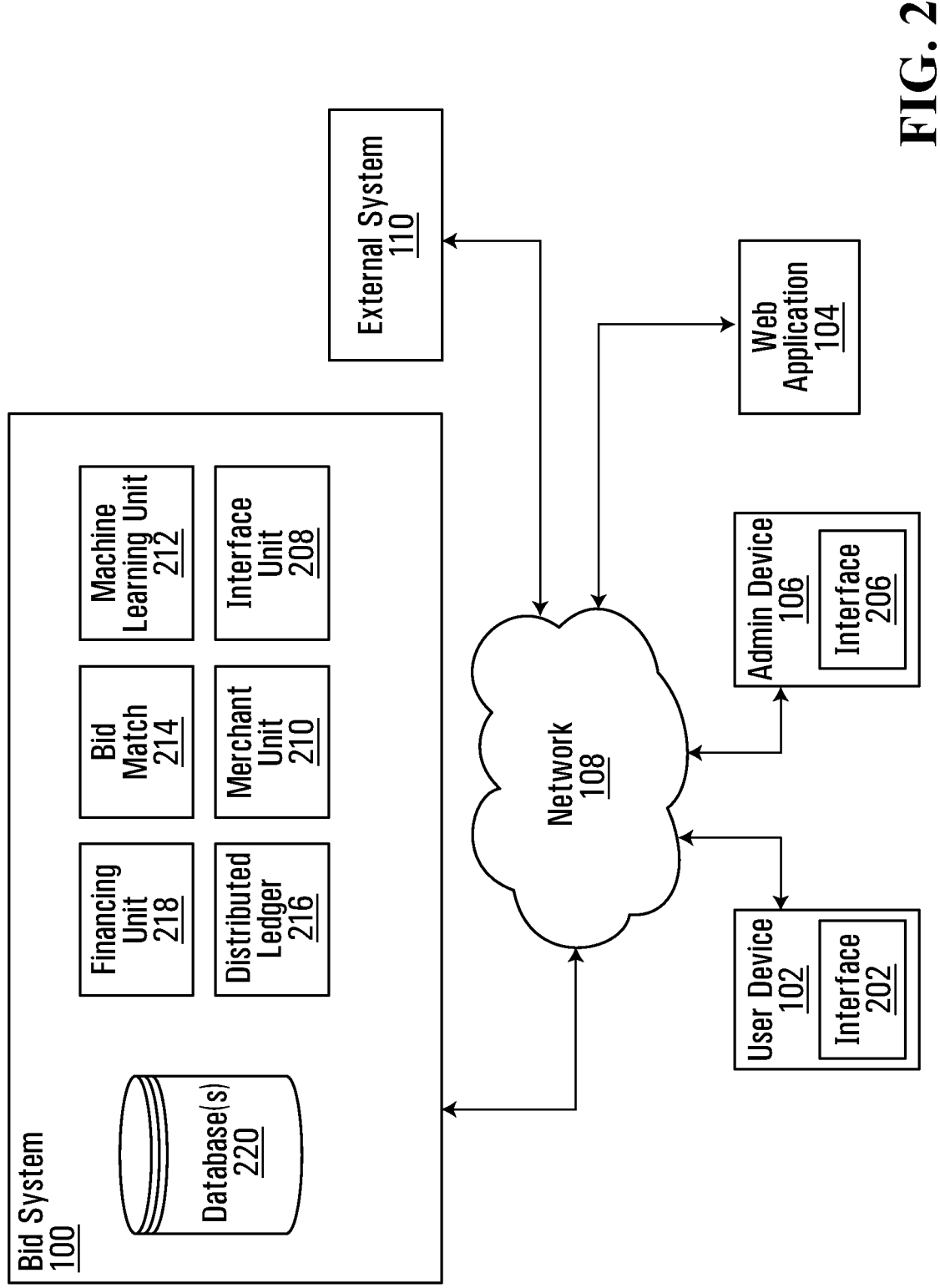
FIG. 2 is a view showing an alternate example of bid platform.

The bid platform 100 allows a user to search for a product the user wants to buy, and click on an indicator link to submit a bid request for the product. The user can search for a product using user device 102 or web application 104, for example. The bid is a way to request offers from merchants/sellers to sell that product to the user and different offered prices. Bid platform 100 receives bids from user device 102 or web application 104, processes the bids, generates a set of offers, and transmits the offers to user device 102 by dynamically updating an interface 202 or web application 104. The solution can integrate directly into a search engine by way of web application 104, for example. The user can bid on a product to purchase while searching, and view responding offers directly in the search engine. Users are able to search for products to buy, submit bids to purchase products, and immediately have responding offers appear in the interface 202 (FIG. 2). The offers can be personalized for the user. Different users may receive different offers, based on many factors processed by machine learning rules 212.

An administrator device 106 connects to bid platform 100 to create and update user profiles, merchant profiles, and financial institution profiles. An administrator device 106 can be referred to as a merchant application 106 in some embodiments and can interact with the bid platform 100 to create and update offer profiles and inventory data. The bid platform 100 connects to external systems 110 to collect user data, inventory data and offer data.

The bid platform 100 provides statistical automatic decision making to match pre-existing offers to user bids. The bid platform 100 uses machine learning rules 212 and distributed ledger 216 to generate a bid record, match a bid to offers and change or update offers to generate interface 202 with visual elements indicating the offers. The bid platform 100 implements the bid process with references to user profiles, merchant profiles, and other data, in real-time. In some embodiments, the bid platform 100 implements automatic decisioning for matching offers to bids using bid match 214 with models.

The bid platform 100 creates a bid smart contract for a product to request offers and adds the bid smart contract to the distributed ledger as a bid event. The bid platform 100 creates an offer smart contract for a product with computer code to automatically request notifications for bids and adds a block with the offer smart contract to the distributed ledger 216 as an offer event. The bid platform 100 automatically matches bid events to offer events. The bid platform 100 automatically notifies merchant application 106 of the bid event recorded on the distributed ledger using the offer smart contract. The bid platform 100 matches bid events (bid requests from customers) to offer events (offers from merchants) and queues the offer events in a priority order based on merchant profiles and offer details. The offer events can indicate different offer prices, delivery locations, discounts, and other special offers (e.g. free complementary service with product purchase). The bid platform 100 automatically transmits matching offers to the user device 102 or web application 104 for display and acceptance. The bid platform 100 receives an accepted offer in response to the bid on the product and starts the payment process to complete the purchase transaction.

In some embodiments, the bid platform 100 can match financial institutions (FIs) or other parties willing to provide financing with a user who has agreed to go ahead with one of the bids. The bid platform onboards users and financing parties. The bid platform 100 creates a finance request smart contract to request financing for the product purchase and adds the finance request smart contract to the distributed ledger 216 as a finance request event. The bid platform 100 creates a finance bid smart contract to respond to the finance request for the product purchase and adds the finance bid smart contract to the distributed ledger 216 as a finance bid event. The bid platform 100 notifies financial institutions (FIs) systems of the finance request event automatically using the distributed ledger 216. The bid platform 100 matches finance request event (finance requests from customers) to finance bid events (offers from FIs to finance purchase) and queues the finance bid events in a priority order based on FI profiles and financing details.

In some embodiments, the bid platform 100 has a blockchain architecture, including the ability to read-lock blocks so a merchant system can ensure accurate bid information is being used when entering or updating a bid, and unlocking the block once the merchant has completed any related writing of offer smart contracts to the distributed ledger 216. The bid platform 100 can lock bid events and offer events until the expiration of a time period or a matching offer has been accepted. The bid platform 100 can lock finance request events and finance bid events until the expiration of a time period or a matching finance bid has been accepted.

In the backend, the bid platform 100 can be operating as a blockchain-based distributed ledger 216 (FIG. 2). The ledger stores individual user/customer profiles, merchant profiles, information about requests and bids, and session data. Data sets may be individually stored as blocks on the distributed ledger 216. The distributed ledger 216 stores bid events, offer events and financing events for automated notification and matching.

While merchant system 112 may be notified of user requests for bids, the bid platform 100 also provides for real-time auto-bidding. Based on the merchant's preferences stored in the merchant profile, on data in the user profile, and other factors, the bid platform 100 may automatically filter requests for bids, and automatically submit bids for merchants. Merchant system 106 can register various items for sale in the bid platform 100, particularly with respect to sponsored listings that currently exist in the shopping area of Google search. When registering a sponsored listing, the merchant system 112 may select to make the item in the listing available for automatic bidding when user requests are received. When receiving a user request for bids, the system may lookup any pre-existing offers in the bid platform 100, perform statistical automatic decisioning, and decide whether to match up a particular merchant offer with the request for bids.

For example, the merchant system 112 may specify preferences to sell to users only in particular geographic regions, or to users meeting various other criteria (e.g. feedback rating, credit score, return rate, etc.). Based on information in the user profile, the bid platform 100 may match the merchant bid automatically to the user, or not; or may automatically vary the bid price based on analyzed risk factors. Machine learning rules 212 (FIG. 2) can enable this functionality by defining bid parameters, offer rules, user parameters, and so on.

The merchant system 112 may be notified by the bid platform 100 directly whenever a request for bids are received to buy an item that the merchant is offering through the bid platform 100. The merchant system 112 may make an offer in response to the request. If the merchant system 106 has a pre-existing offer awaiting automatic decisioning, and that offer is not matched by the bid platform 100 to the user, the bid platform 100 will provide the merchant system 106 with a report as to why the offer was not provided to the user (e.g. what factors contributed to the bid platform deciding the merchant's offer should not be matched). The merchant system 106 may then be provided with options to adjust any preferences for the automatic decisioning.

As an example, products sponsored through a search engine or online shopping can show up for bids. In some embodiments, bid platform 100 includes an API to integrate with merchant e-commerce websites to provide for real-time inventory lookup for bids. The bid platform 100 allows merchant system 112 to list selected items for bidding in a sponsored area. The bid platform 100 can be integrated with one search engine, or expanded to work across many search engines and other web applications 104.

In some embodiments, bid platform 100 has an architecture with read/write-locking session blocks on a distributed ledger 216 or blockchain ledger.

The terms of the purchase and any other related events can also be written to the distributed ledger as a smart contract that can be implemented using computer code. The ledger 216 can be built using a blockchain platform in some embodiments with smart contract concurrency execution. Where bids are received with input from merchants after the user request for bids has been received, a solution enables the read-locking of blocks on the ledger to ensure merchants may make bids based on current data. This can be helpful because merchant messages (e.g. offers) and bids can collide with each other in accessing smart contracts on the blockchain ledger. Two merchants can be bidding on the same request, but basing their bids on different instances in time of the bid request data or offer data. The bid platform 100 provides an order to avoid a sneak bid or offer in-between when a merchant reads and writes their offer.

When making a request for bids, a session is initiated, and bids are then attached or linked to the bid session. The bid platform 100 can temporarily store the session before writing it to the blockchain ledger. The application state and historical state is maintained by bid platform 100. There may be a time window in which merchants may place bids after the user's request is received, or the request may indicate that only immediate bids (bids pre-existing in the system) are to be presented. Accordingly bids and offers may be linked to a session identifier.

In some embodiments, the bid platform 100 implements financing. In addition to the bidding, there is also a financing component. After agreeing to buy the product for one of the offers, the user may also opt for financing, which may also be bid on by parties, such as Financial Institutions, for example. Each FI may have different requirements for onboarding, but the bid platform 100 may collect a certain amount of baseline information from the user when initially registering with BMB (or otherwise in advance), and that information may be reused and passed to the bidding FIs, with the user's consent, to allow the FIs to make manual or automated bids for financing. The bid platform 100 may also obtain a user finance/credit score from FICO, to send to the bidding FIs. At least from a technical perspective, this could allow FIs, or independent third parties who wish to finance transactions, to do so from anywhere in the world. There may also be integration with a secure payment system to allow for a bank login to be used to login to the bid platform 100 through a search engine.

FIG. 2 is a view showing an alternate example of bid platform 100. Bid platform includes an interface unit 208 to generate and update in interface 202 on user device 102. The interface unit 208 also updates an interface 206 on administrator device 106. The interface 206 can indicate a product for purchase and an indicator to submit a bid to receive offers for the product. Interface unit 208 receives the bid and interacts with bid match unit 214 and machine learning unit 212 to generate a set of offers in response to the bid. Merchant unit 210 stores offers linked to merchants in distributed ledger 216 using smart contracts. The offers can be linked to merchant data in database 220 including pricing data and inventory data. The interface unit 208 updates interface 202 to indicate the set of offers in response to the bid. Web application 104 can interact with interface 202 to display products for purchase and indicators to receive bids.

The bid platform 100 is configured to generate and update an interface 202 at user device 102 for electronic commerce. The bid platform 100 has a plurality of nodes providing a distributed ledger 216. Each node can include a computing device to implement part of a distributed network of computing devices. The bid platform 100 has a processor configured to process machine interpretable instructions to receive a bid for a product from a user device 102 or web application 104. The processor can transmit a request to store a bid event as a block on the distributed ledger 216. The block indicates a purchaser identifier and a product identifier, for example. The processor of the bid platform 100 can transmit notification of the bid event by way of merchant unit 210. The processor can receive offers for the bid from a plurality of merchant devices. The processor can transmit another request to store offer events as additional blocks on the distributed ledger 216. The additional blocks can indicate merchant identifiers and can be linked to the block storing the bid event. The processor can process the bid event to generate a set of offers from the offer events at the distributed ledger 216, by way of the bid match 214, for example. The processor can, using interface unit 208, generate an interface 202 with visual elements to indicate the set of offers for display at the user device 102. The interface 202 has selectable indicia configured to be responsive to input to select a selected offer of the set of offers. Responsive to selectable indicia, the processor can receive the selected offer of the set of offers at the interface 202. The processor of the bid platform 100 can store a purchase event as a purchase block on the distributed ledger 216. The purchase event can indicate the bid event and the selected offer.

The user locates a product to purchase by way of interface 202 or web application 104. The user clicks a bid indicator button to submit a bid for the product. This creates a bid session for the product. Bid platform 100 can lock portions of the distributed ledger during the bid session. The bid session can be associated with an active time period or expiry time. If no offers are received in response to the bid during the active time then the user can extend the bid session in order to receive offers. Bid platform 100 processes the bid to generate a set of offers. Bid match unit 214 matches the bid to offers recorded on distributed ledger 216 to generate the set of offers. The offers can be implemented using smart contracts that code conditions for the offer. The bid can be implemented using smart contracts that code conditions for the bid. Bid match unit 214 can process the smart contracts to automatically match the bid to offers. The interface 202 or web application 104 update to show the set of offers. The user selects an offer to complete the purchase transaction. In some embodiments, financing options for the purchase transaction are generated by bid platform 100 for selection by user. The financing options are recorded on distributed ledger 216. User interface 202 or web application 104 update to indicate the financing options for selection.

Merchant unit 210 uses smart contracts to generate bid events that define bid parameters to receive notifications for received bids. Merchant unit 210 receives a bid and generates a set of notifications for merchants. Merchant unit 210 can also use smart contracts to generate offer events that define offer parameters to receive notifications for received bids. Merchant unit 210 uses smart contracts to automatically match offers to bids in order to generate a set of offers in response to receiving a bid.

Merchant unit 210 and machine learning unit 212 uses smart contracts to automatically match pre-existing offers to a user bid. Machine learning unit 212 uses rules to match bids with requests, or change bids, based on user profiles, merchant profiles, and other data, in real-time. Database 220 stores the smart contracts for machine learning unit 212 and merchant unit 210. Machine learning unit 212 can generate smart contracts with rules to automate notifications and matching. Machine learning unit 212 can also process historical data and session data to generate smart contracts and analytic reports.

Bid platform 100 includes a distributed ledger 216 to store blocks on a block chain in some embodiments. The blocks (or entries) record events corresponding to bids, offers, and purchase transactions. The distributed ledger 216 generates read-lock blocks so a merchant can ensure accurate bid or offer information is being used when entering or updating an offer. The distributed ledger 216 is configured to unlock the block once the merchant has completed any related writing of offers to the ledger. The distributed ledger 216 can be a block chain, for example. Blocks can also refer to entries of the distributed ledger 216.

Bid platform 100 includes a financing unit 218 that matches FIs or other parties willing to provide financing with a user who has agreed to go ahead with one of the bids. Financing unit 218 records finance bids and finance offers on the distributed ledger 216. Financing unit 218 receives a financing bid of an accepted offer for a bid on a product, generates a financing event on the distributed ledger using the smart contracts, propagates the financing event using the distributed ledger, receives one or more financing offers, generates one or more offer events, and receives an accepted financing offer.

Bid platform 100 has one or more features including a decentralized architecture, an onboarding process for merchants, financial institutions and customers, smart contracts, network management, reliable performance, and reusability.

Bid platform 100 can be decentralized with network operations being provided by a consortium of participants such as merchants, financial institutions and customers. Bid platform 100 can be decentralized and implemented using a network of nodes. The network of nodes can leverage the communication, connectivity, event propagation through a block chain or distributed ledger implementation. Bid platform 100 enables merchants and FIs to have accounts setup on the distributed ledger 216. The distributed ledger 216 can be referred to as a block chain, for example. Trusted merchants can host a block chain node on their premises, depending on the distributed ledger 216 infrastructure. In some examples, the merchant can connect to the distributed ledger 216 via a set of APIs. FIs can host nodes on their premises. The client bid requests and the actual bid can be implemented using Smart contracts on the distributed ledger 216. Event communication and propagation between nodes of the distributed ledger 216 is provided via a network. Adaptors can be implemented to propagate bid events to their respective destination, to review and act upon them. Bid platform 100 provides superior performance, with high transaction throughput and low latency, to fulfill the real-time requirements for the bidding engines. Bid platform 100 ensures high availability and fault tolerance for the platform in the distributed network. Bid platform 100 includes bid and offer components that are reusable and can be leveraged for other assets (property, merchandise, services, financing etc.).

Figure 3:
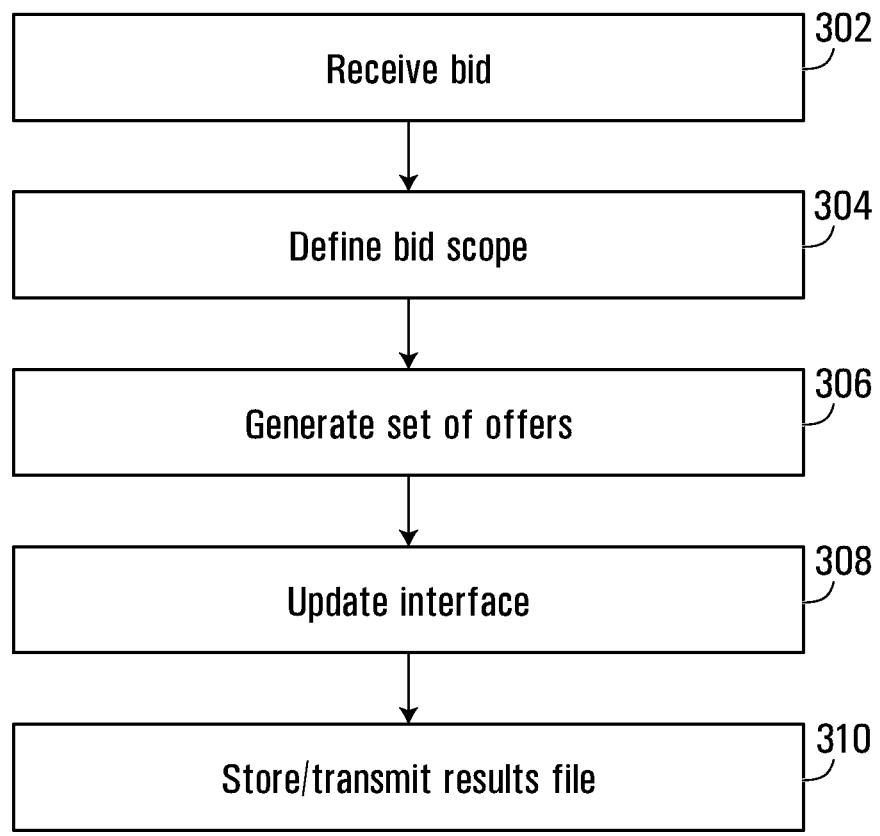
FIG. 3 is a flowchart diagram of a process for bidding according to some embodiments.

FIG. 3 is a flowchart diagram of a process for bidding according to some embodiments. At 302, bid platform 100 receives a bid for a product from user device 102. At 304, bid platform 100 defines the bid scope which includes an active time range for the bid, a user identifier corresponding to the user device 102 or user, product identifier, geographical information, and other data relating to the bid. The bid platform 100 stores a bid event on a distributed ledger using smart contracts for bids. At 306, bid platform 100 automatically generates a set of offers from merchants to respond to the bid. The bid platform 100 records offer events on the distributed ledger using the smart contracts. The bid platform 100 transmits notifications of the bid event to merchants with corresponding offer events. The bid platform 100 automatically matches the bid event to offer events to generate a set of offers. At 308, bid platform 100 updates an interface at user device 1022 indicate the set of offers in response to the bid. Each offer in the set of offers is selectable by a user to complete the purchase transaction for the product. The offers indicate a purchase price for the product. The purchase prices in the offers can be different depending on the customer and the merchant. At 310, bid platform 100 stores and transmits the results file indicating the bid, the set of offers, and a selected offer. The bid platform 100 receives a selected offer of the set of offers. The bid platform 100 stores a purchase event on the distributed ledger, the purchase event indicating the bid event and the selected offer. The bid platform 100 uses the distributed ledger to record events and propagate notifications of bids and offers.

Figure 4:
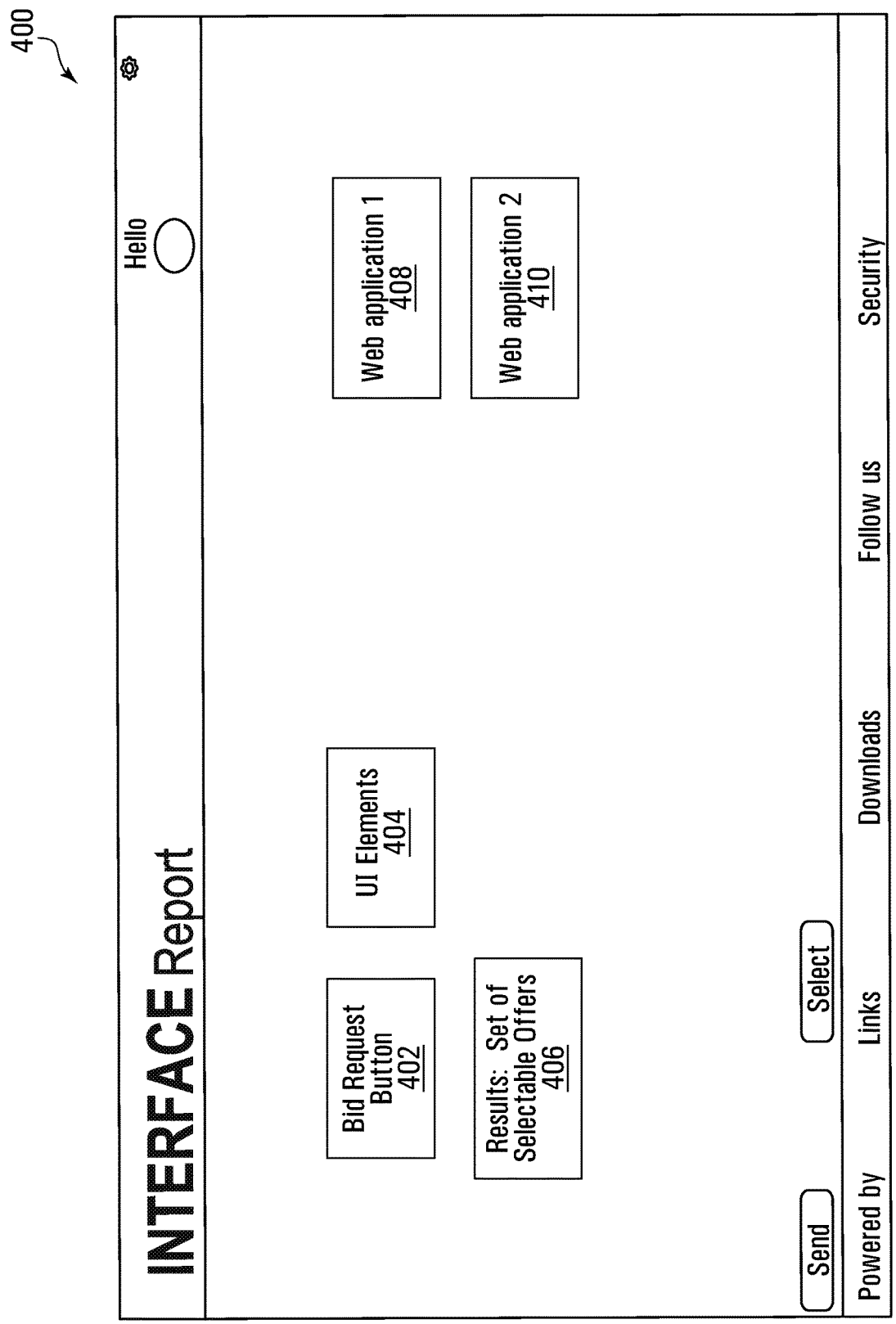
FIG. 4 is an interface for bid platform according to some embodiments.

FIG. 4 is an interface controllable by bid platform 100 according to some embodiments. Bid platform 100 updates interface by dynamically populating visual elements with bid data, offer data, financing data, and so on based on automated decisions. The interface 400 includes a bid request button 402 to submit a bid for a product to bid platform 100. The bid can include a product identifier and a user identifier. The interface 400 indicates results including the set of offers. Each offer in the set is selectable by the user by way of selectable indicia 306. A user can use the interface with a search engine to identify a product they want to purchase. The user then selects the bid request button 402 inside the interface 400. The interface 400 updates instantaneously to present a list of offers including offered purchase prices for the products from local merchants that have the requested product in their inventory. The list of offers can also include coupons in some embodiments. The user selects an offer to complete the purchase transaction. The interface 400 can also display financing offers, as described herein. The interface 400 can include UI elements 404 representing reports and other data managed by system. The interface 400 can include web applications 408, 410 for connecting to external accounts or interfaces.

Figure 5A:
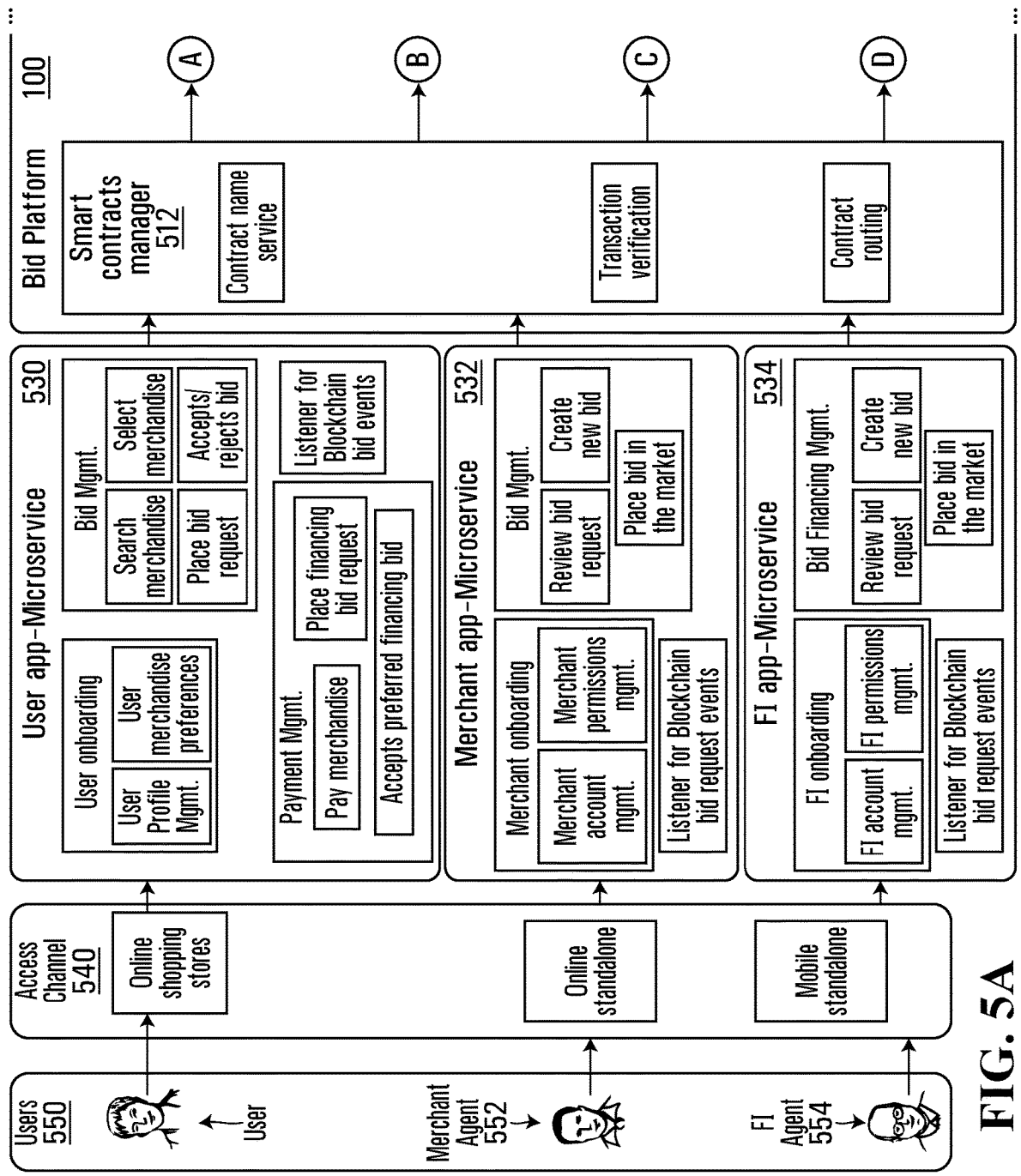
FIGS. 5A and 5B are views of bid platform according to some embodiments.
Figure 5B:
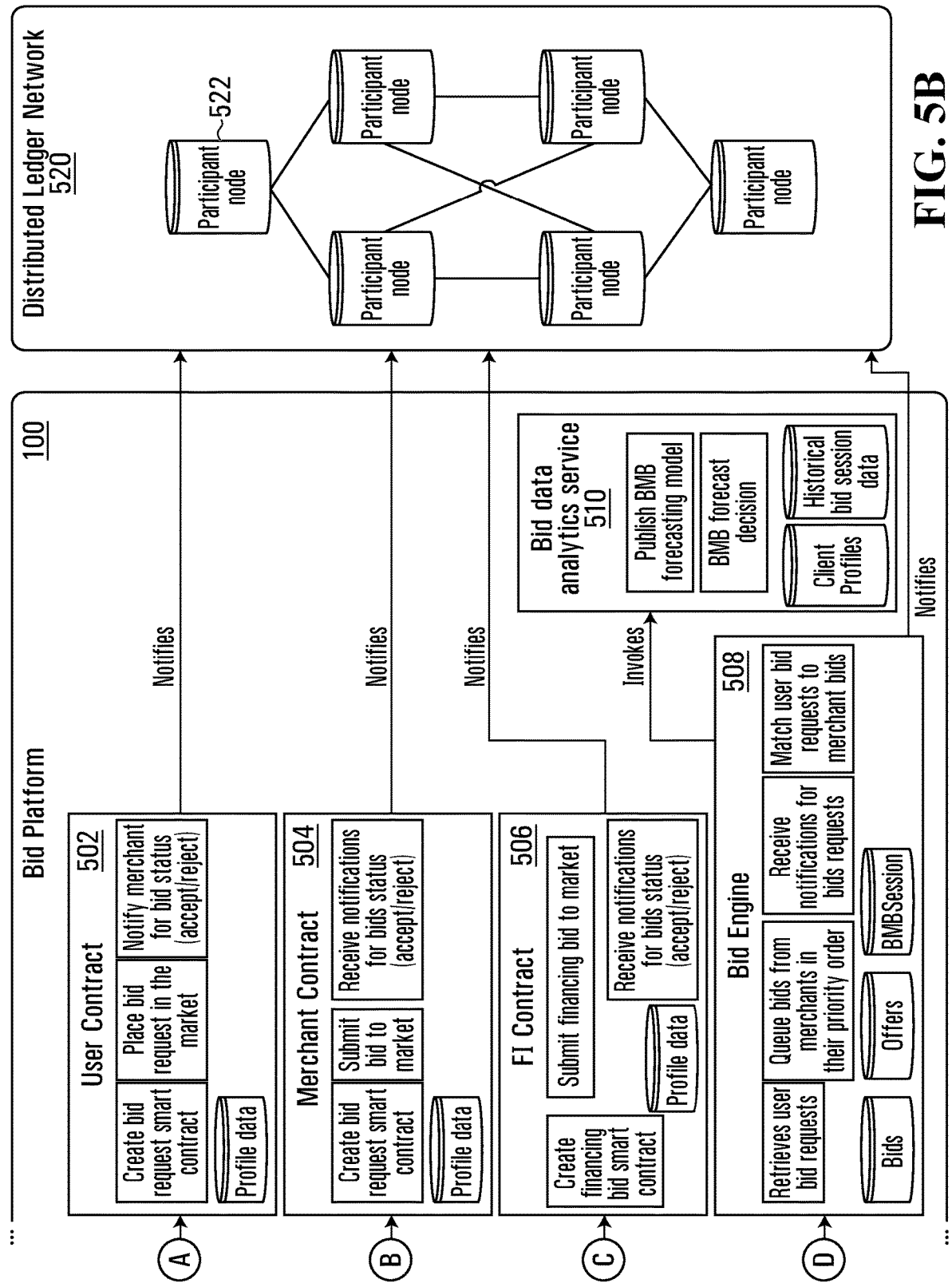

FIGS. 5A and 5B are views of bid platform 100 (or BMB platform) according to some embodiments.

Bid platform 100 interacts with a distributed ledger network 520 to record data (e.g. blocks) for bids and offers, along with smart contracts to define conditions for automated processing. The distributed ledger network 520 includes participant nodes 522 to maintain the data for the distributed ledger network 520. The participant nodes 522 can include computing devices to implement a distributed network of computing devices. The participant nodes 522 can correspond to merchants, financial institutions and customers in some embodiments. The distributed ledger network 520 can be used for event notification and propagation between participants. The distributed ledger network 520 propagates events in the network, capturing changes in bid or offer statuses. The distributed ledger network 520 can be used for securely logging the bid events and offer events, ensuring that the bid session cannot be tampered with by participants. The distributed ledger network 520 is used to securely store the successful offer events and purchase transactions, which have been accepted by the customer. A purchase transaction involves a bid for product and a selected offer. The purchase transactions will become fulfilled after the client completes the payment transaction.

The distributed ledger network 520 includes business data including: a token for the equivalent product which is under bidding; events, such as transactions bids, offers, decisions from clients (accept/rejects); merchant and FIs accounts; and cash tokens, to match block chain currency in value, for on-chain payments. The distributed ledger network 520 includes smart contract (business logic, process, rules) for bid and offer rules and processes. The bid and offer can be referred to as an auction, for example.

The bid platform 100 includes a bid engine 508 and service implementations for the client APIs. The bid engine 508 includes a matching engine which retrieves the bid requests from clients and matches them against merchants/financing offers. The merchant offers can be modeled as priority queues, based on price, time, client preferred location, or other client preferences. The bid engine 508 can manage profile information for clients and merchants, bids and offers in data stores. The bid platform 100 implements bid analytics by processing transaction data on the distributed ledger network 520. The ledger transaction data captures a wealth of information around the bid patterns. This data can be further processed using machine learning models to classify it, cluster it, identify relationships between bids, offers, and merchant responsiveness, and optimize the merchant engagement process.

The bid platform 100 includes API service implementations. The bid platform 100 exposes APIs for its external clients' interactions such as for end-client, for merchant and Financial Institution providing financing services. These APIs can also be responsible for relaying the ledger notifications for any changes in the bid request or bid statuses.

Client or user application 530 provides services for the end client to onboard the bid platform 100, to place bid requests, to accept or reject merchant offers and to complete the payment flow. This component can integrate with the online shopping stores to be able to select a product and request merchants to provide an offer in response. Client application 530 defines smart contracts or user contracts 502 for bids that can be stored on the distributed ledger 520.

Merchant application 532 allows the merchant to onboard a profile and configurations to the bid platform 100. Merchant application 532 define smart contracts or merchant contracts 504 for notifications to be alerted when new bid requests are received for products in its catalogues, to create and place its bids in the market.

Financial Institution application 534 allows the participant FIs to onboard a profile and configurations to the bid platform 100. Financial institution application 530 for defines FI contracts 506 to submit financing offers. Financial institution application 534 enables FIs to review requests for financing, to create and place financing offers for these requests.

Users 550 use access channels 540 to access user applications 530. Merchant agents 552 access merchant application 532 to interact with bid platform 100 FI agent 554 access FI application 530 to interact with bid platform 100.

The user application 530 enables user onboarding for user profile management and merchandise or product preferences user application 530 enables bid management to search for products, select products, place bid requests, and accept or reject offers. The user application 530 includes a payment manager to pay for products, place financing bid requests and except preferred financing offers. The user application 530 has a listener for events recorded on the distributed ledger network 520.

The merchant application 532 enables merchant onboarding for merchant account management and merchant permissions management. The merchant application 532 enables bid or offer management to review bid requests, create new offers, and place the offer on the distributed ledger network. The merchant application 532 has a listener for events recorded on the distributed ledger network 520 to automatically process bids, submit offers and receive notifications.

The financial institution application 534 enables FI onboarding for account management and permission management. The financial institution application 534 enables bid financing management functionality to review financing bid requests, create new financing offers and place the financing offer on the distributed ledger network 520.

The bid platform 100 has a smart contracts manager 512 to manage user contracts 502, merchant contracts 504, and FI contracts 506, the user contracts 50 to create bid request smart contracts, place the bid request on the distributed ledger network 520 and notify merchants of bid statuses. The merchant contract 504 creates offer smart contracts, submits offers to the distributed ledger network 520, and receives notifications for offer status. The FI contracts 506 create financing bid smart contracts, submit financing bids to the distributed ledger network 520 and receive notifications for bid status.

The bid platform 100 has a bid engine 508 to receive bid requests, offers from merchants in a priority order, receive notifications for bid requests, and match user bids automatically to merchant bids using machine learning rules. The analytics service 510 publishes forecasting models and decisions based on client profiles and historical bid session data.

The bid platform 100 implements account management so that merchants and FIs can create and manage their own accounts in the distributed ledger network 520. In some embodiments, end-users are not given their own accounts in distributed ledger network 520, to avoid the overhead of the keys management operations at the consumer level.

The bid platform 100 implements permission and using smart contracts to ensure participants have authorized access. The bid platform 100 implements bid session privacy. For example, merchant offers can be private and they cannot be accessed outside of the bid session. In some embodiments, the merchant offers can only be read by the client and the merchant placing the offer. The other merchants May not have access to the existing offers, not placed by them. In some embodiments, merchants can be aware of the others offers, can read the lowest offer and place a newer lower offer. Conflict can happen when all offers are at their lowest price (same attributes).

The bid platform implements security such as Secure Multipart Computations (MPC) or Zero Knowledge Proofs to ensure the security of the bid matching computation correctness and fairness without disclosing sensitive data. Transactions can be signed by the user's applications before being sent to the smart contract layer. Transaction signing is done using user's key pair and a hashing value of the transaction data.

this.account.sign(password,hash).then(function(sign)

A smart contract can have computer code to automatically verify the signatures and if they do not match the transaction they can be automatically rejected.

The bid platform 100 implements a contract naming service. The contract naming service is a contract that returns the address of the target contract when queried by the contract name. The existing contracts need to be registered with this service, prior of their actual lookup.

The bid platform 100 implements business logic using machine learning rules or smart contracts. For example business logic can be abstracted via specific smart contracts on the distributed ledger network 520 or via distributed and modular architecture, leveraging event sourcing and reactive technologies stack.

Contract Manager 512 can be responsible with smart contract registration, lookup by their address (invoking a ContractNamingService) and routing execution to the appropriate smart contract. Each smart contract is recorded on the distributed ledger network 520 at a corresponding address. The smart contracts contain code or rules to automate its evaluation.

The user contracts 502 create bids for client, initiate the bid session and can be able to retrieve the merchant offers placed for the bid session. A matching between offers and bid will be done via filtering the bid session criteria. Offers will be sorted by the user's bid preferences (location, price, product availability) and will be presented in the interface starting with the highest offer matching the bid, for example.

The bid platform 100 integrates different participants including users 550 merchants 552 and FIs 554. Participants can connect to the platform via REST API layer, for example. The Rest API layer can interface with the distributed ledger layer and re-route the requests to the Smart contracts RPC calls. Alternatively, trusted participants can host their own ledger node on their own premises.

The bid platform 100 implements blocking so that events our recorded in the ledger and dispatched to their destination as required. This will allow processing to happen in the background without the blocking the current execution thread, as in any typical event sourcing design.

The bid platform 100 implements concurrency so that smart contract execution on the distributed ledger is sequential, single threaded and not parallelized in some embodiments. In order to ensure design modularity, and reusability, a formal locking proxy contract can be implemented by the bid platform 100.

In some embodiments, the bid platform 100 provides a Read/Write locked contract implementation, which maintains two new fields: readers and writers to keep track of the currently active readers and writers. The new modifiers canRead and canWrite can be used for get and set operations correspondingly. The acquireReadLock allows its caller to acquire the lock as long as there is no active writer in the system, by registering it in the readers mapping. In some embodiment, bid platform 100 can release the locks or have an expiration, if the readers connectivity has failed suddenly.

Figure 6A:
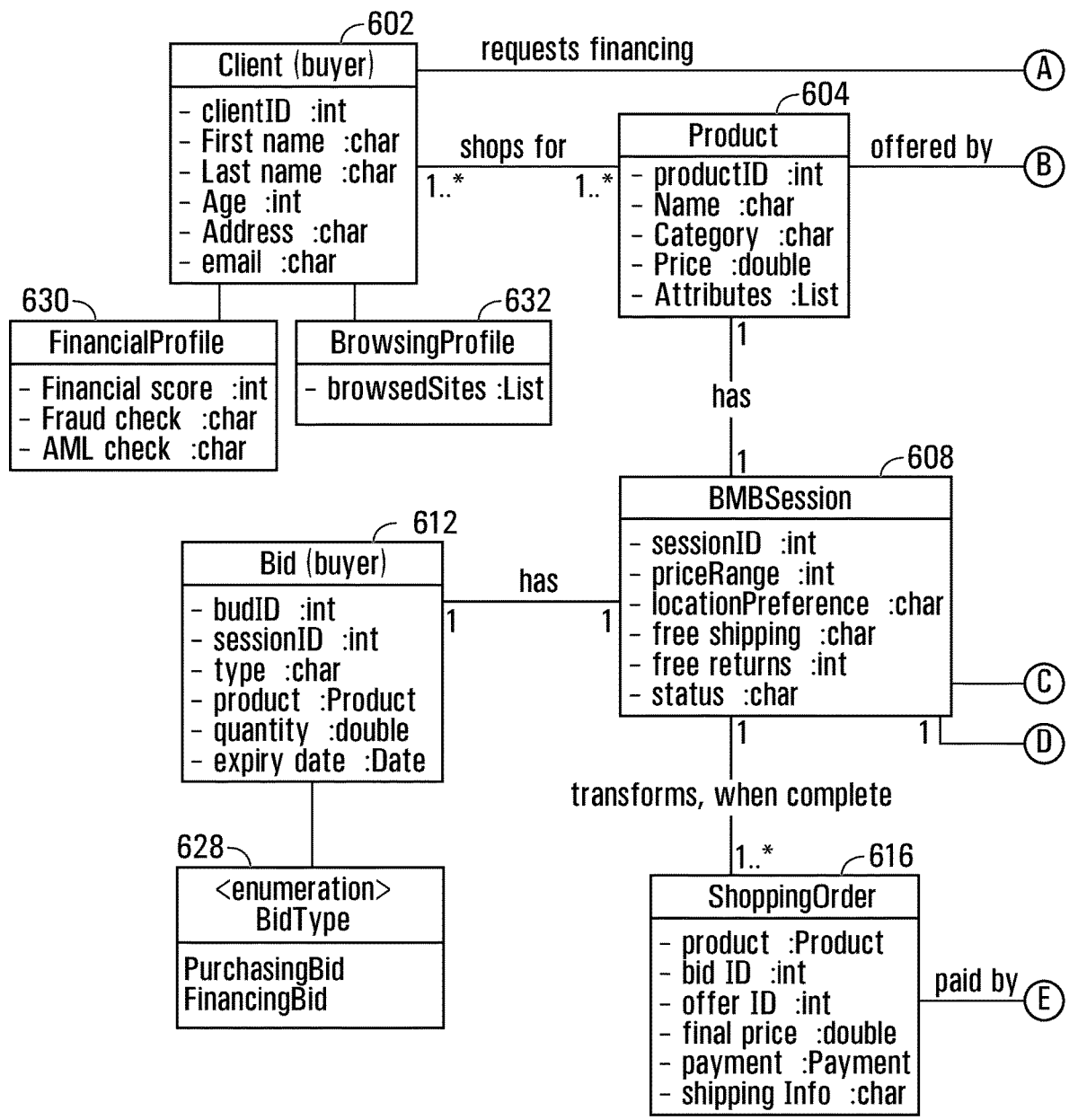
FIGS. 6A and 6B are views of data structures for bid platform according to some embodiments.
Figure 6B:
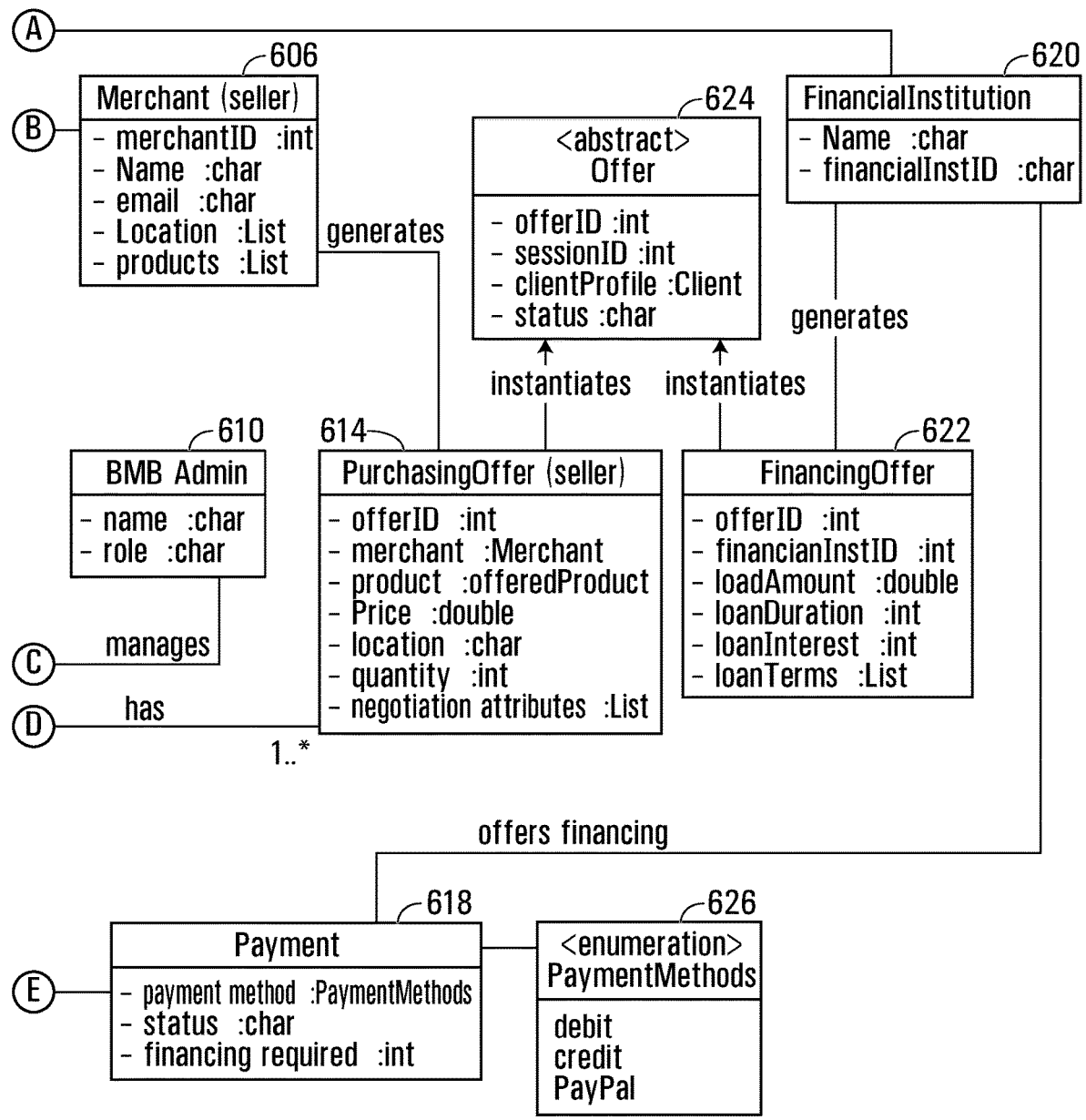

Bid platform 100 can implement statistical automated decision-making. The bid offers can be decisioned automatically by leveraging a statistical forecasting model (in case of competing bid sessions). An example model can use as input features the following example data elements:

Static data: Bid; BMBSession duration; Merchant feedback; Shipping fees; Product Evolving data: Current price; Time left; Current number of offers; Current number of merchants Price dynamic data: Price velocity: Price acceleration FIGS. 6A and 6B are views of data structures for bid platform according to some embodiments. The data structures include different data classes and attributes. A client 602 can include attributes including a client identifier, name, age, address, email and so on. The client 602 shops for a product 604 offered by a merchant 606 and requests financing from a financial institution 620. A product 604 can include attributes including a product identifier, name, category, price and so on. A merchant 606 can include attributes including merchant identifier, name, email, locations, products or inventory. A client 602 is connected to a financial profile 630 and a browsing profile 632. The client 602 shopping for a product 604 creates a bid session 608. The bid session 608 can include a session identifier, a price range, location preferences, shipping options, return options, time ranges, and an active status. A bid administrator 610 manages the bid session 608. The bid session 608 has bid 612 received from the client 602. The bid 612 includes a bid identifier, session identifier, type, product, price, quantity and an expiry date. Merchant 606 generate purchase offers 614 in response to the bid. The purchase offer 614 includes an offer ID, merchant, product, price, location, quantity, negotiation attributes, and so on. Accordingly, a bid session 608 has a bid 612 and one or more purchase offers 614. Purchase offers 614 are used to instantiate offers 624. A client 602 can select a purchase offer 6142 to complete the shopping orders 616. The shopping orders 616 is completed by a payment 618 that is processed using payment methods 626. A financial institution 620 can offer financing for the payment 618 using a financing offer 622. The financing offer 622 is also used to instantiate offers 624. The financing offer 622 is also another example bid type 628.

Figure 7A:
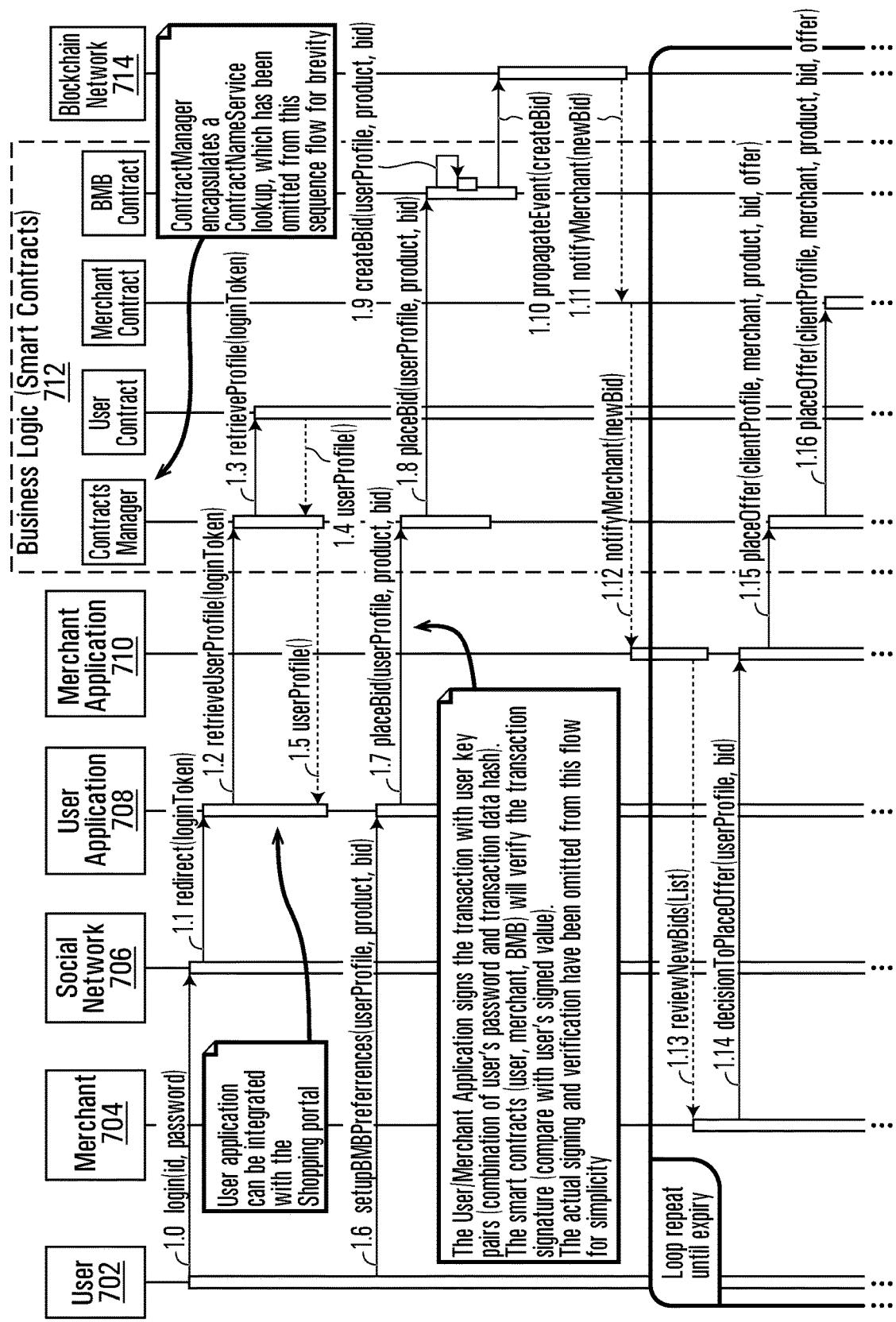
FIGS. 7A and 7B are flowchart diagrams of a process for bidding according to some embodiments.
Figure 7B:
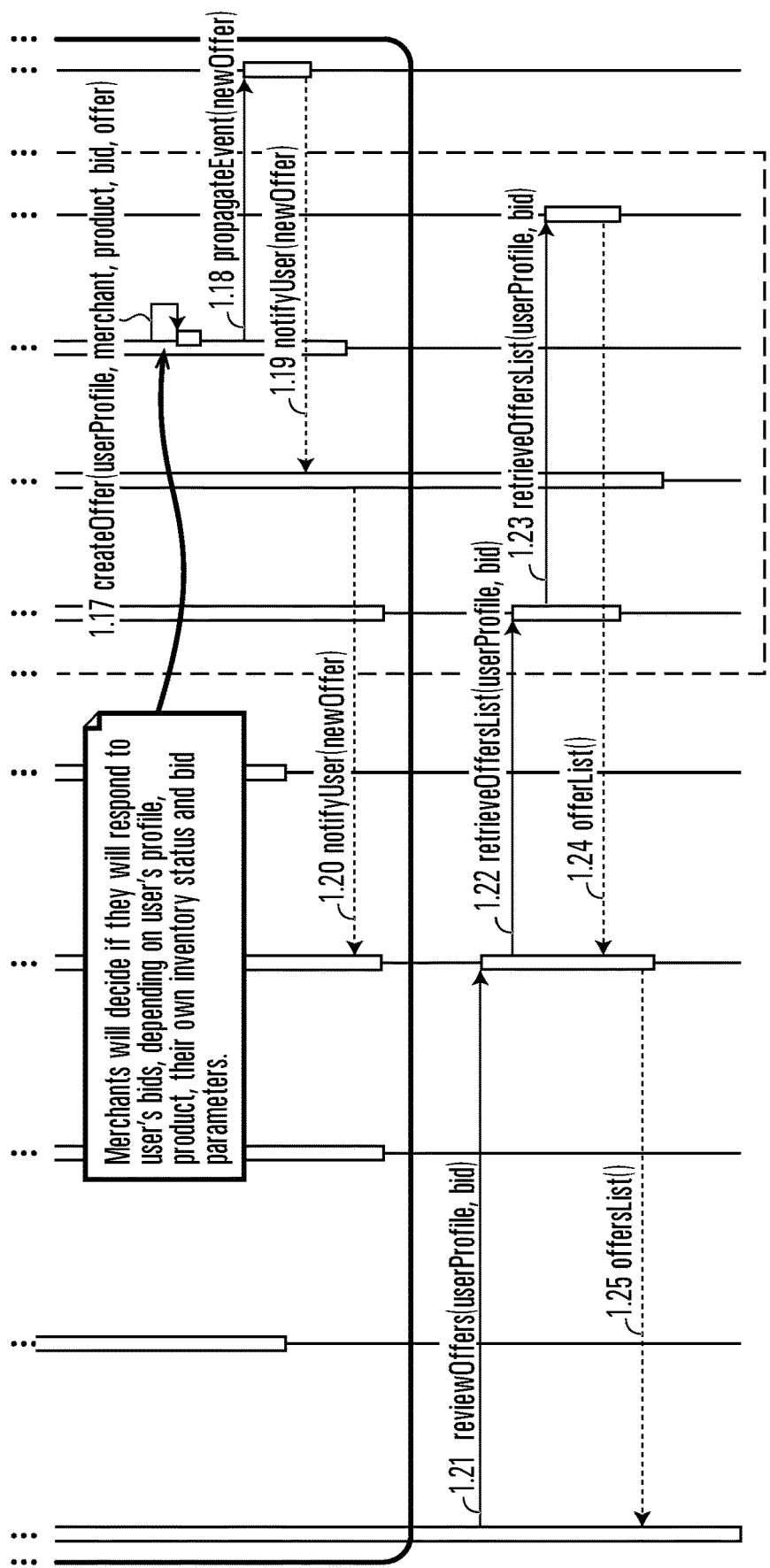

FIGS. 7A and 7B are flowchart diagrams of a process for bidding according to some embodiments. A user 702 logs into an online platform such as a social network or search engine 706 to access the user application 708. The user 702 can also log in directly to the user application 708. The user 702 uses user application 708 to create or update a user profile managed as a smart contract 712. The user 702 uses user application 708 to set up bid preferences that identify the user, product and a bid request. When user 702 places a bid then a smart contract 712 is used to define the bid parameters are scope. The user application 708 signs the bid transaction with the user key pair and smart contracts 712 will verify the transaction signature. The block chain network 714 propagates the bid event to merchants 704 by way of merchant application 710. Smart contracts 71 to include merchant contracts to listen to bid events and automate the notification to merchants 704. The merchant 704 uses merchant application 710 to generate merchant contracts or smart contracts 712. The merchant application 710 enables merchant 704 to respond to the user bid depending on the user profile, product, inventory status and bid parameters. The merchant application 710 interacts with smart contracts 712 to create and place offers in response to the bid. Smart contracts 712 interact with the block chain network 714 to notify the user of the received offer. The user application 708 can update to indicate the received offer. Offers can be received until the expiration of the bid. User 702 reviews all received offers. User 702 selects an offer to complete the purchase transaction. The block chain network 714 is used to automatically propagate events including bids and offers to merchant application 710 and user application 708. Smart contracts 712 include user contracts, merchant contracts for notifications and offers, and bid contracts.

Figure 8:
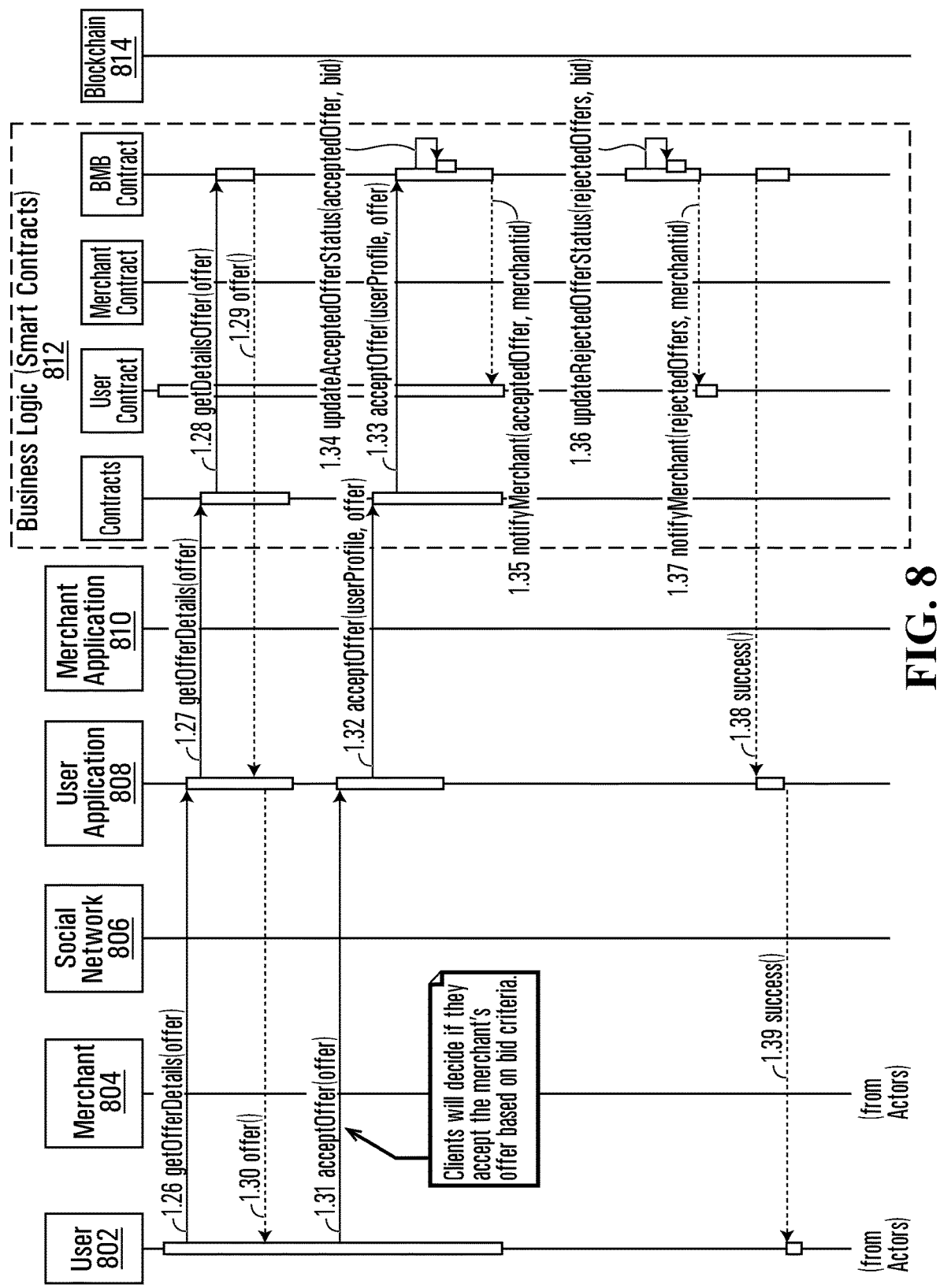
FIG. 8 is a flowchart diagram of a process for bidding according to some embodiments.

FIG. 8 is a flowchart diagram of a process for bidding according to some embodiments. A user 802 gets offer details by way of user application 808. The user application 808 interacts with smart contracts 812 to automatically retrieve offer details. The merchants 80 for use merchant application 810 two create merchant contracts for notifications of bids and offers. The user 802 reviews offers by way of user application 808 and accepts an offer. The user application 808 notifies smart contracts 812 of the accepted offer. Smart contracts 812 interact with block chain 8142 propagate the notification of an accepted offer to merchant application 810. Smart contracts 812 interact with block chain 8142 notify merchant application 810 of rejected offers a user 802 will accept if they accept the merchants offer based on the bid criteria.

Figure 9:
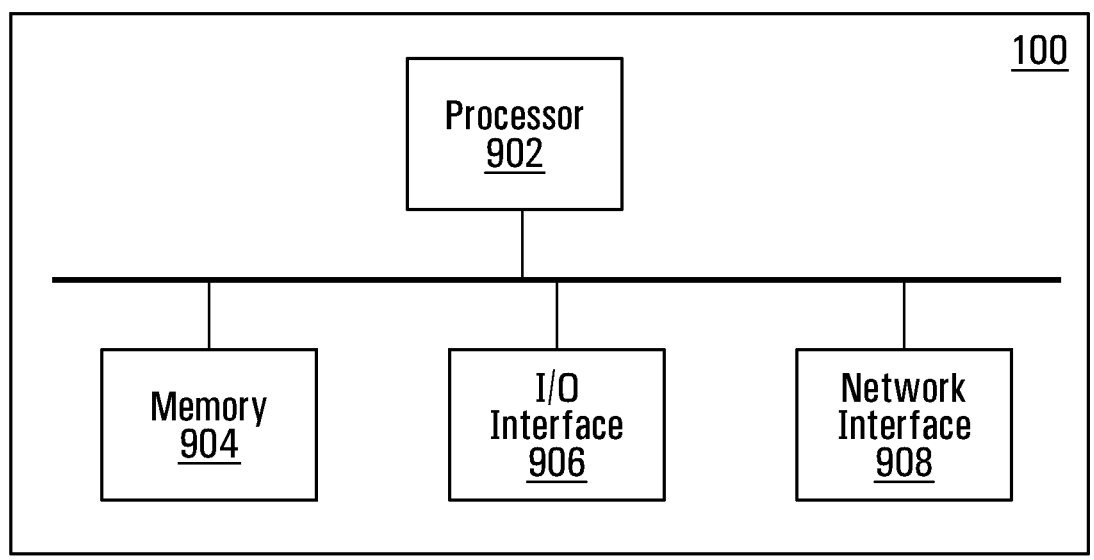
FIG. 9 is an example hardware diagram for some embodiments.

FIG. 9 is an example hardware diagram for some embodiments. The bid platform 100 includes at least one processor 902, memory 904, at least one I/O interface 906, and at least one network interface 908.

Each processor 902 may be, for example, any type of general-purpose microprocessor or microcontroller, a digital signal processing (DSP) processor, an integrated circuit, a field programmable gate array (FPGA), a reconfigurable processor, or any combination thereof.

Memory 904 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 906 enables bid platform 100 to interconnect with one or more input devices, such as a keyboard, mouse, camera, touch screen and a microphone, or with one or more output devices such as a display screen and a speaker.

Each network interface 908 enables bid platform 100 to communicate with other components, to exchange data with other components, to access and connect to network resources, to serve applications, and perform other computing applications by connecting to a network (or multiple networks) capable of carrying data.

The bid platform 100 is operable to register and authenticate users (using a login, unique identifier, and password for example) prior to providing access to applications, a local network, network resources, other networks and network security devices.

Figure 10:
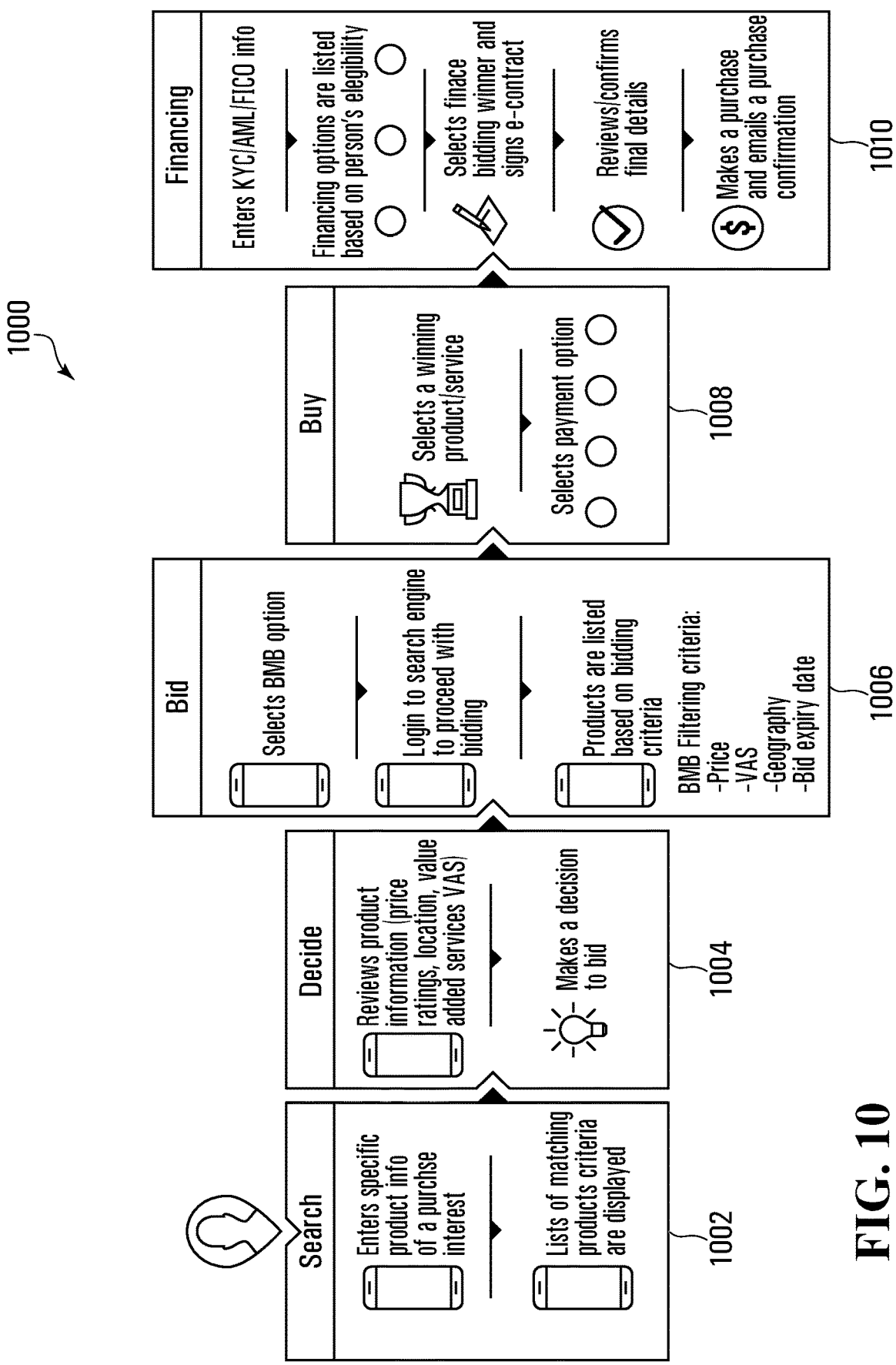
FIG. 10 is a flowchart diagram of a process for bidding according to some embodiments.

FIG. 10 is a flowchart diagram of a process 1000 for updating an interface according to some embodiments. At 1002, the user enters specific product information of a purchase interest into a search engine interface at a user device. A processor receives a list of matching products and updates the interface to display a list of matching products. At 1004, the user reviews the product and makes a decision to submit a bid to purchase a product. At 1006, the user, by way of the interface, selects the bid button (e.g. selectable indicia displayed as a visual element on interface) and logs into a user application to proceed with bidding. The products are listed based on bidding criteria which can include, for example, price, value added service, geography, and the bid expiry date. The bid is processed by a processor receiving the bid request, and in response, the processor updates visual elements on the interface to display offers on the interface. The bid request can include a product identifier, a user identifier, and bid criteria. At 1008, the user selects a desired offer to complete the purchase. The user selects a payment option. The user submits a financing bid and the processor receives the finance request that corresponds to the financing bid. The finance request can include a product identifier, a user identifier, bid identifier, offer identifier, merchant identifier, and so on. The finance request can include know your client (KYC) data. In response, at 1010, the processor generates a number of financing offers based on user eligibility and updates the interface to display the financing offers. The user selects a desired finance offer and provides an electronic signature to sign an electronic contract to complete the purchase and financing.

Figure 11:
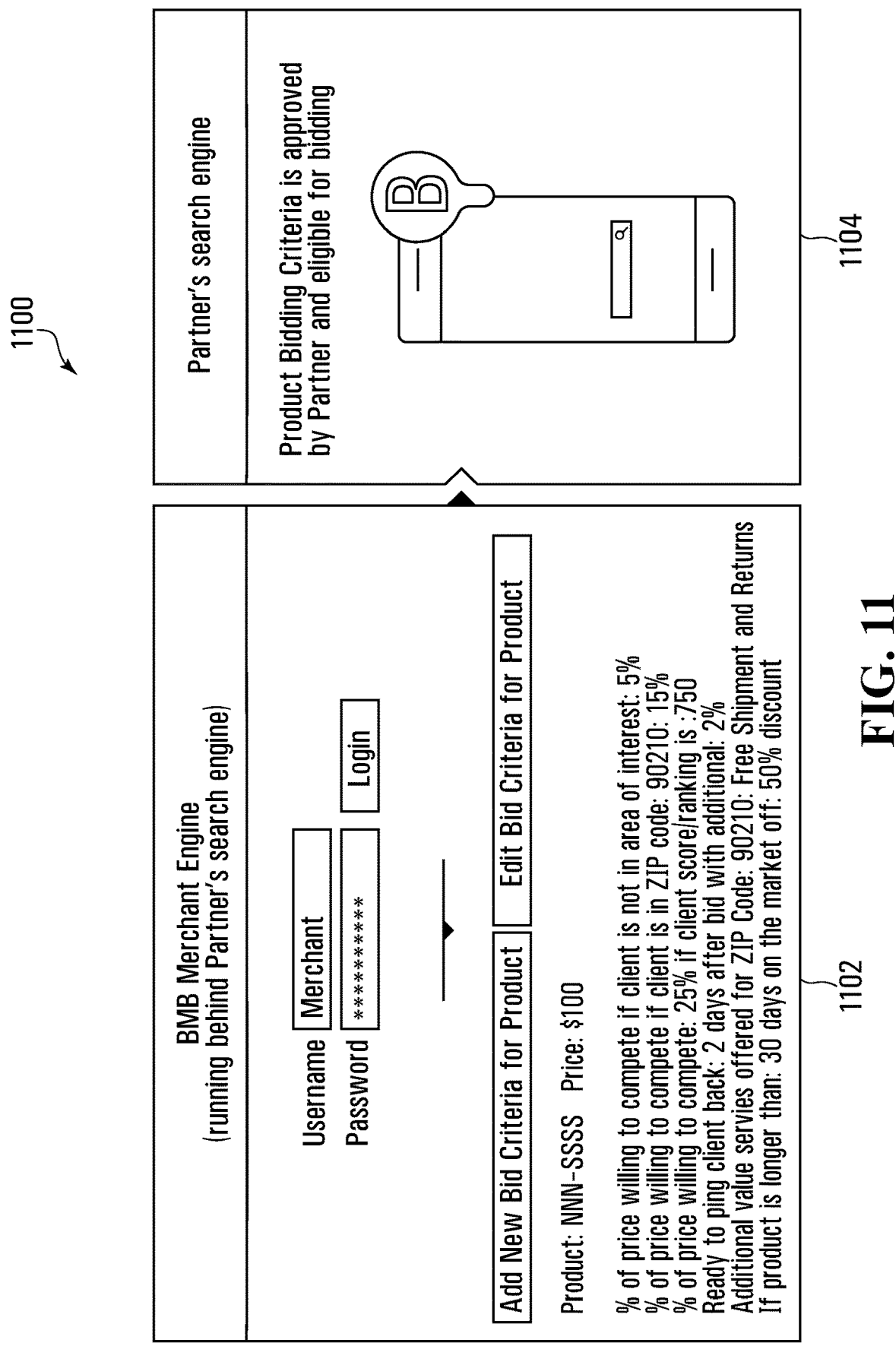
FIG. 11 is an example interface for some embodiments.

FIG. 11 is an example interface 1100 according to some embodiments. This is an example interface 1102 for a merchant application. The interface includes a merchant engine where a merchant can login using a merchant identifier (or username) and password. The merchant can add new offer criteria for a bid for a product or edit offer criteria for a bid for a product. The product is defined by way of a product identifier. The offer criteria includes an offer price for the product. The offer can include multiple offer rules with parameters. The offer rules can relate to discounts. The offer rules can relate to geographic locations. The offer rules can relate to a client score or ranking. The offer rules can relate to communications with the client. Other value add services such as free shipment and returns can also be defined by offer rules. There can also be a time range for discounts defined by offer rules. The offer is submitted and approved by bid platform 100. Merchant smart contracts define the offer and the rules. Example offer rules include: percentage of a price willing to compete or reduce if client is not in an area of interest; percentage of a price willing to compete or reduce if client is in an area of interest; percentage of a price willing to compete or reduce if client has at least a threshold score or rank; percentage of a price willing to compete or reduce if product is on the market for longer than a threshold time period. A partner search engine 1004 can process the offers for approval prior to being eligible for a bid for a product.

Figure 12:
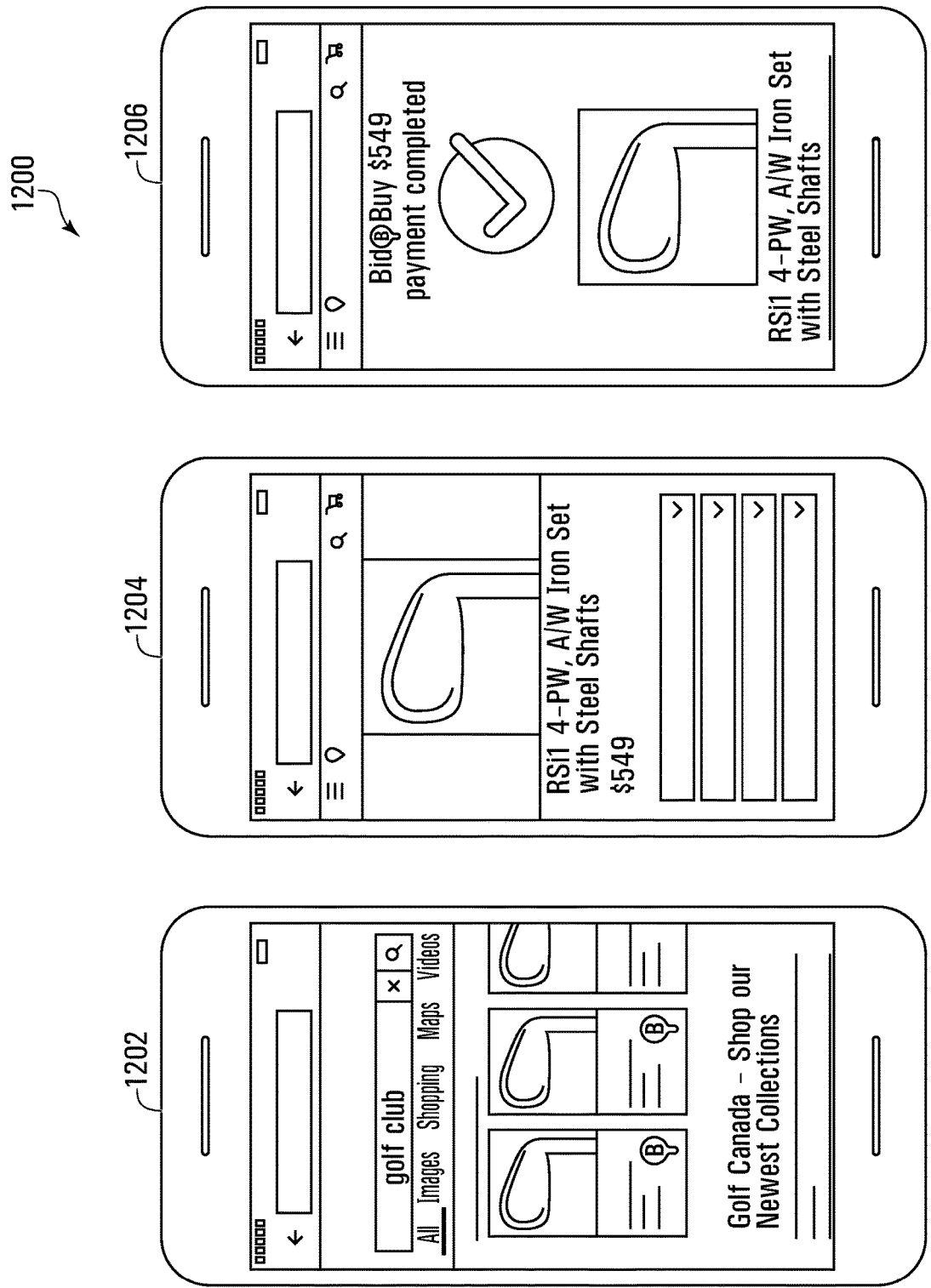
FIG. 12 shows example interfaces for some embodiments.

FIG. 12 shows example interfaces 1200 for some embodiments. This is an example interface for a mobile device that may be referred to as a user device or purchaser device. The interface 1202 shows a listing of products along with bid request buttons. The interface 1204 shows the selected product along with offers generated by merchants in response to the bid request. The interface 1206 shows a selected offer and payment options or a button to trigger a financing request.

FIG. 13 is a flowchart diagram of a process 1300 for bidding according to some embodiments. At 1302, the user searches for a product and selects a bid button to submit a bid request for the product. The bid request defines the product, the user, and the geographic location of the user. The user reviews a list of offers and selects an offer and proceeds with financing. The accepted offer is processed through an electronic contract and electronic signature. The user can also receive financing offers and can select a desired financing offer to complete the purchase. At 1304, in some embodiments, the process 1300 can start with a presentation of a product and a bid button (to submit a bid request) as part of an electronic advertisement. At 1306, in some embodiments, the process 1300 can start with a presentation of a product and a bid button (to submit a bid request) as part of an electronic notification or message.

FIG. 14 is a flowchart diagram of a process 1400 for bidding according to some embodiments. The flowchart includes a process 1402 without a bid and a process 1406 with the bid. The process 1406 with the bid is improved because the user is presented with tailored and customized quotes or offers. The user controls the process and the request in some embodiments. A process 1404 without a bid can start with a presentation of a product and a bid button (to submit a bid request) as part of an electronic advertisement. A process 1404 with a bid can start with a presentation of a product and a bid button (to submit a bid request) as part of an electronic advertisement.

Figure 15A:
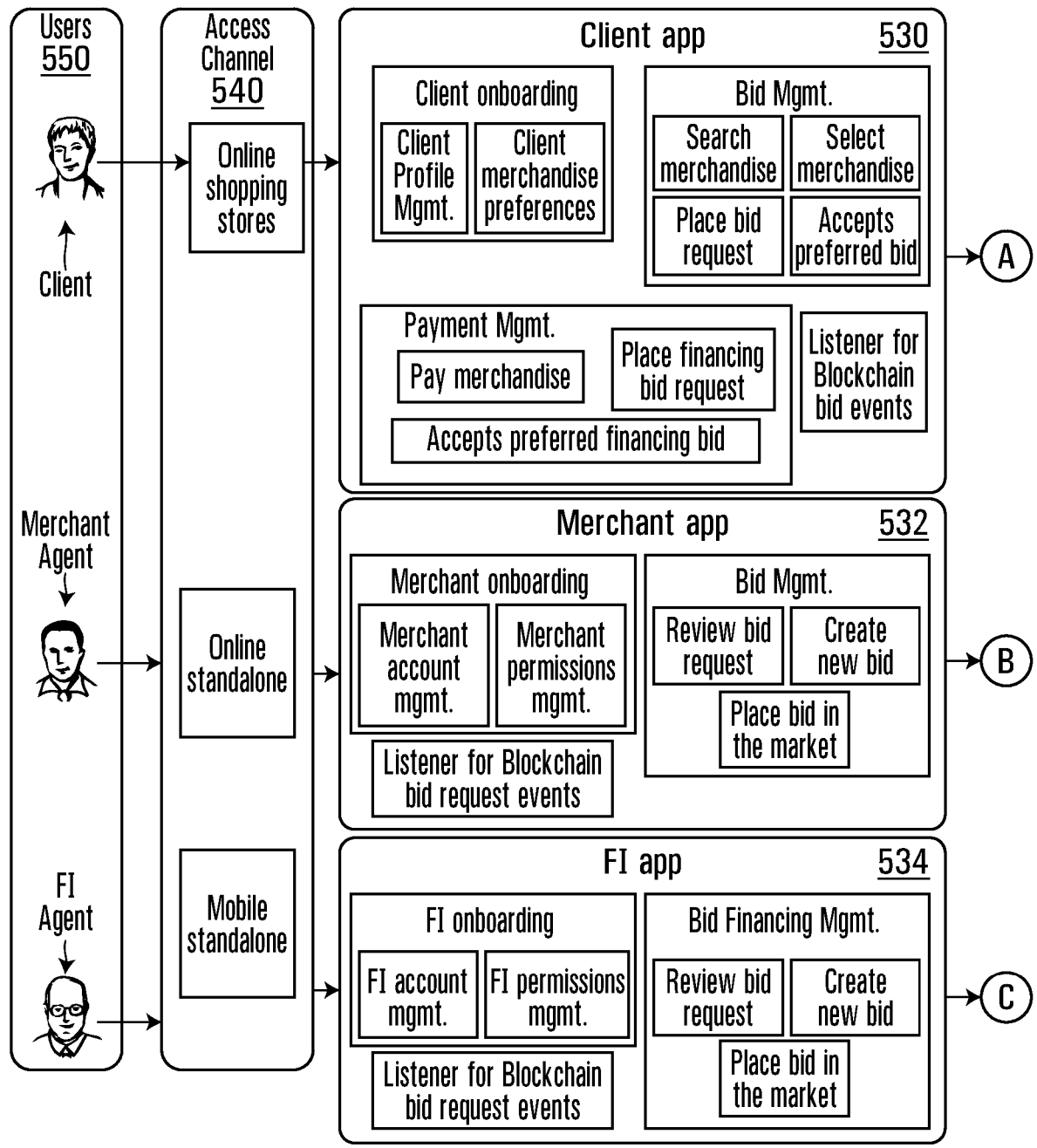
FIGS. 15A and 15B are further views of bid platform according to some embodiments.
Figure 15B:
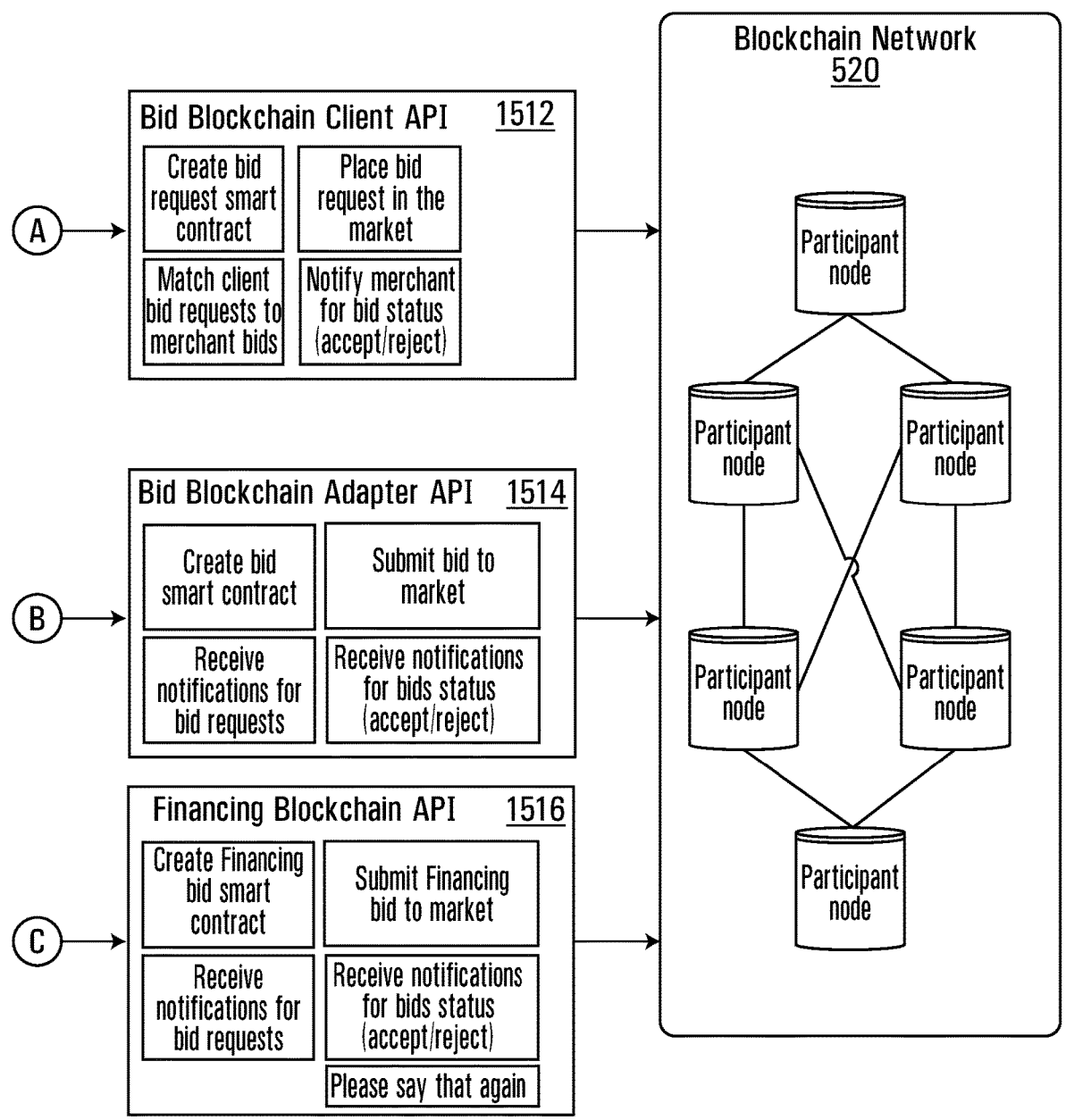

FIGS. 15A and 15B are further views of bid platform according to some embodiments. The bid platform includes a client API 1512, an adapter API 1514, and a financing API 1516. The client API 1512 creates a bid request smart contract and places the bid request smart contract on the block chain network. The client API 1512 matches the client bid request to merchant offers. And notifies the merchant of the bid status and whether there offer has been accepted or rejected using the block chain network. The adapter API 1514 creates an offer smart contract and submits the offer smart contract to the block chain network. The adapter API 1514 receives notifications for bid requests and receives notifications for offer status and whether they have been accepted or rejected. The financing API 1516 creates financing bid smart contracts and submits the financing bid contract to the market using the block chain network. The financing API 1516 receives notifications for bid requests and receives notifications for bid status from the block chain network.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

Various example embodiments are described herein. Although each embodiment represents a single combination of inventive elements, all possible combinations of the disclosed elements include the inventive subject matter. Thus if one embodiment comprises elements A, B, and C, and a second embodiment comprises elements B and D, then the inventive subject matter is also considered to include other remaining combinations of A, B, C, or D, even if not explicitly disclosed.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A system for generating and updating a user interface for electronic commerce, the system comprising:
    a plurality of nodes providing a distributed ledger, each node comprising a computing device;
    a processor configured to process machine interpretable instructions to:
        receive a bid for a product from a purchaser device;
        initiate a bid session for the bid, the bid session having a session identifier and an active status;

transmit a request to store a bid event as a block on the distributed ledger, the block indicating the session identifier, a purchaser identifier and a product identifier;

transmit notification of the bid event;

continuously receive offers for the bid from a plurality of merchant devices upon determining that the bid session has the active status;

transmit another request to store offer events as additional blocks on the distributed ledger, the additional blocks indicating the session identifier and merchant identifiers and being linked to the block storing the bid event;

process the bid event to generate a set of offers from the offer events by matching the bid event to the offer events stored at the distributed ledger;

generate an interface with visual elements to indicate the set of offers for display at the purchaser device, the interface having selectable indicia configured to be responsive to input to select a selected offer of the set of offers;

responsive to selectable indicia, receive the selected offer of the set of offers at the interface;

lock the block storing the bid event and the additional blocks storing the offer events until the selected offer is received or the bid session no longer has the active status; and store a purchase event as a purchase block on the distributed ledger, the purchase event indicating the bid event and the selected offer.

2. The system of claim 1, wherein the block storing the bid event has computer code implementing a bid smart contract indicating bid parameters and bid time period.

3. The system of claim 1, wherein the block storing the offer event has computer code implementing an offer smart contract indicating an offer rule.

4. The system of claim 3, wherein the offer rule indicates a percentage of a price discount and a condition for the price discount.

5. The system of claim 4, wherein the condition for the price discount relates to a customer rank or score, the processor being configured to compute the customer rank or score based on purchase data.

6. The system of claim 3, wherein the plurality of nodes are configured to implement concurrency so that smart contract execution on the distributed ledger is sequential, single threaded and not parallelized.

7. The system of claim 1, wherein the processor is configured to:

generate a finance request to request financing for the product purchase;

record the finance request as a block on the distributed ledger as a finance request event;

generate and transmit notification of the finance request event using the distributed ledger;

create a finance bid to respond to the finance request for the product purchase;

record the finance bid as another block on the distributed ledger as a finance bid event;

match the finance request event to the finance bid event and queue the matched finance bid event in a priority order;

transmit the matched finance bid event to populate the interface with an additional visual element indicating data relating to the matched finance bid event for display at a purchaser device and acceptance using another selectable indicia of the interface;

responsive to the other selectable indicia at the interface, receive an accepted finance offer; and complete the purchase transaction using the accepted finance offer.

8. The system of claim 7, wherein the block storing the finance request has computer code to implement a finance request smart contract for the finance event.

9. The system of claim 7, wherein the block storing the finance bid has computer code to implement a finance bid smart contract for the finance event.

10. The system of claim 1, wherein the processor is configured to automatically match pre-existing offers to user bids using machine learning rules.

11. The system of claim 1, wherein the plurality of nodes are configured to read-lock blocks when entering or updating a block, and unlocking the block once any related writing to the distributed ledger is completed.

12. The system of claim 1, wherein the processor is configured to generate the bid session for the purchaser by generating the session identifier, a price range, location preferences, shipping options, return options, time ranges, and an active time period for the active status, wherein the processor is configured to update the bid session to extend the active status if no offer events are received within the active time period.

13. A bid platform with a data storage device and a processor configured to:

create a bid smart contract for a product to request offers;

records the bid smart contract on a distributed ledger as a bid event, the distributed ledger managed by a plurality of nodes, each node having a computing device;

initiate a bid session for the bid event, the bid session having an active status;

create an offer smart contract for a product to request notifications for bids for the product;

upon determining that the bid session has the active status, add the offer smart contract to the distributed ledger as an offer event of offer events stored as additional blocks on the distributed ledger;

automatically match the bid event to the offer events;

generate and transmit notification of the bid event recorded on the distributed ledger using the offer smart contracts;

queues the offer events in a priority order based on merchant profiles and offer details;

transmits a set of offers to populate an interface with visual elements indicating the set of offers for display at a purchaser device and acceptance using a selectable indicia of the interface;

responsive to the selectable indicia, receive an accepted offer in response to the bid on the product;

lock the block storing the bid event and the additional blocks storing the offer events until the selected offer is received or the bid session no longer has the active status;

complete a purchase transaction for the product using the accepted offer; and store a purchase event on the distributed ledger.

14. The bid platform of claim 13, wherein the processor is configured to:

create a finance request smart contract to request financing for the product purchase;

record the finance request smart contract to the distributed ledger as a finance request event;

create a finance bid smart contract to respond to the finance request for the product purchase;

record the finance bid smart contract to the distributed ledger as a finance bid event;
generate and transmits notification of the finance request event using the distributed ledger;
match finance request event to finance bid event and queues the matched finance bid events in a priority order;
transmit a set of finance offers to populate the interface with additional visual elements indicating the set of finance offers for display at a purchaser device and acceptance using another selectable indicia of the interface;
responsive to the other selectable indicia at the interface, receive an accepted finance offer; and
complete the purchase transaction using the accepted finance offer.

15. The bid platform of claim 13, wherein the processor is configured to lock events recorded on the distributed ledger, and unlock the events when responding events are recorded on the distributed ledger.

16. The bid platform of claim 13, wherein the processor is configured to generate the bid session for the purchaser by generating a session identifier, a price range, location preferences, shipping options, return options, time ranges, and an active time period for the active status, wherein the processor is configured to update the bid session to extend the active status if no offer events are received within the active time period.

17. The bid platform of claim 13, wherein the block storing the bid event has computer code implementing the bid smart contract indicating bid parameters and bid time period.

18. The bid platform of claim 13, wherein the block storing the offer event has computer code implementing the offer smart contract indicating an offer rule.

19. The bid platform of claim 18, wherein the offer rule indicates a percentage of a price discount and a condition for the price discount.

20. The bid platform of claim 19, wherein the condition for the price discount relates to a customer rank or score, the processor being configured to compute the customer rank or score based on purchase data.

21. The bid platform of claim 13, wherein the plurality of nodes are configured to implement concurrency so that smart contract execution on the distributed ledger is sequential, single threaded and not parallelized.

22. The bid platform of claim 13, wherein the processor is configured to:
generate a finance request to request financing for the product purchase;
record the finance request as a block on the distributed ledger as a finance request event;
generate and transmit notification of the finance request event using the distributed ledger;
create a finance bid to respond to the finance request for the product purchase;
record the finance bid as another block on the distributed ledger as a finance bid event;
match the finance request event to the finance bid event and queue the matched finance bid event in a priority order;
transmit the matched finance bid event to populate the interface with an additional visual element indicating data relating to the matched finance bid event for display at a purchaser device and acceptance using another selectable indicia of the interface;
responsive to the other selectable indicia at the interface, receive an accepted finance offer; and
complete the purchase transaction using the accepted finance offer.

23. The bid platform of claim 13, wherein the processor is configured to automatically match pre-existing offers to user bids using machine learning rules.

24. The bid platform of claim 13, wherein the plurality of nodes are configured to read-lock blocks when entering or updating a block, and unlocking the block once any related writing to the distributed ledger is completed.

25. A computer readable medium comprising computer executable instructions that when executed by a processor configure the processor to implement a process for:
receiving a bid for a product and storing a bid event as a block on a distributed ledger using smart contracts;
initiating a bid session for the bid, the bid session having an active status;
continuously receiving offers for the bid and storing offer events as additional blocks on the distributed ledger using the smart contracts upon determining that the bid session has the active status;
transmitting notification of the bid event;
processing the bid event to generate a set of offers from the offer events;
updating an interface to indicate the set of offers, the interface having selectable indicia configured to be responsive to input to select a selected offer of the set of offers;
receiving the selected offer of the set of offers;
locking the block storing the bid event and the additional blocks storing the offer events until the selected offer is received or the bid session no longer has the active status; and
storing a purchase event on the distributed ledger, the purchase event indicating the bid event and the selected offer.

\* \* \* \* \*